United States Patent [19]
Ishihara

[11] Patent Number: 5,337,575
[45] Date of Patent: Aug. 16, 1994

[54] DISPLAY APPARATUS FOR DISPLAYING ABNORMALITIES IN LOW TEMPERATURE CABINETS

[75] Inventor: Michiharu Ishihara, Shimane, Japan

[73] Assignee: Hoshizaki Denki Kabushiki Kaisha, Toyoake, Japan

[21] Appl. No.: 930,626

[22] Filed: Aug. 17, 1992

[30] Foreign Application Priority Data

Aug. 16, 1991 [JP] Japan .................................. 3-231208
Aug. 19, 1991 [JP] Japan .................................. 3-231002

[51] Int. Cl.5 ............................................. F25B 49/02
[52] U.S. Cl. ........................................ 62/126; 62/127; 62/298
[58] Field of Search ................. 62/126, 127, 129, 130, 62/298; 236/49; 165/11.1; 340/521, 523, 584, 585

[56] References Cited

U.S. PATENT DOCUMENTS

| | | | |
|---|---|---|---|
| 4,381,549 | 4/1983 | Stamp, Jr. et al. | 62/126 |
| 4,387,578 | 6/1983 | Paddock | 62/127 |
| 4,827,730 | 5/1989 | Doi et al. | 62/127 |

FOREIGN PATENT DOCUMENTS

| | | |
|---|---|---|
| 60-10383 | 1/1985 | Japan . |
| 60-10387 | 1/1985 | Japan . |
| 63-226578 | 9/1988 | Japan . |

Primary Examiner—Harry B. Tanner
Attorney, Agent, or Firm—Nikaido, Marmelstein, Murray & Oram

[57] ABSTRACT

In a low temperature storage house having a temperature sensor for detecting an internal temperature of the storage house, a cooling apparatus for cooling the interior of the storage house, cooling control means for repetitively controlling operation and stop of the cooling apparatus based on the internal temperature detected by the temperature sensor and for maintaining the internal temperature in a value between predetermined upper and lower limit temperatures, and display means for indicating the internal temperature detected by the temperature sensor in the form of letters, an abnormal display apparatus for the low temperature storage house comprises abnormal detection means for detecting the plural kinds of abnormalities respectively occurring in the low temperature storage house; abnormal data forming means for forming abnormal data indicative of each of the abnormal kinds in accordance with the kinds of abnormalities detected by the abnormal detection means; and display control means for applying each of the abnormal data formed by the abnormal data forming means and the internal temperature data indicative of the internal temperature respectively to the display means at lapse of a predetermined time such that the display means indicates the kinds of abnormalities and the internal temperature dependent on each of the abnormal data sequentially and alternately with lapse of time.

5 Claims, 18 Drawing Sheets

DISPLAY APPARATUS FOR DISPLAYING ABNORMALITIES IN LOW TEMPERATURE CABINETS

BACKGROUND OF THE INVENTION

1. Field of the Invention

The present invention relates to a low temperature storage cabinet such as a refrigerator, a freezer or the like, the cooling apparatus of which is controlled to maintain an internal temperature of the storage cabinet in a predetermined range between upper and lower temperature limits. The invention also relates to a display apparatus for indicating various abnormalities of the storage cabinet to the user or the serviceman. These abnormalities may include excessive flow of electric current to a compressor of the storage cabinet, excessive rise of temperature of the compressor, excessive rise or drop of the internal temperature of the storage cabinet, and disconnection or short of a temperature sensor in the storage cabinet.

2. Discussion of the Prior Art

In Japanese Patent Laid-open Publication No. 63-226578, there is disclosed a low temperature storage cabinet provided with a lamp to be turned on upon the occurrence of an abnormality in the storage cabinet. Japanese Utility Model Laid-open Publications Nos. 60-10383 and 60-10387 disclose a low temperature storage cabinet provided with a number of alarm lamps which are aligned to be turned on upon the occurrence of various abnormalities for indicating plural abnormalities in a binary notation.

In the former storage cabinet, however, it is impossible to recognize the nature of the abnormality. In the latter storage cabinet, the on-off operation of the alarm lamps make it difficult to identify the nature of the abnormalities by the user or the serviceman.

In these types of low temperature storage cabinets, various abnormalities will occur in a chain reaction due to one or more faults in the storage cabinets. The recognition of the respective natures of abnormalities is useful to find the fault or faults in the storage cabinet. In the prior art, however, it is very difficult to indicate to the user or the serviceman the respective natures of various abnormalities.

SUMMARY OF THE INVENTION

It is, therefore, an object of the present invention to provide a display apparatus for the low temperature storage cabinet in which a display device for displaying an internal temperature of the cabinet in the form of letters is utilized to display various abnormalities in such a manner that a fault or faults in the storage cabinet can be easily recognized by the user or the serviceman.

It is another object of the present invention to provide a display apparatus for the low temperature cabinet capable of indicating the respective natures of the abnormalities in the order of their occurrence for easy recognition of the fault or faults in the storage cabinet.

It is a further object of the present invention to provide a display apparatus capable of indicating only the existing abnormalities.

According to the present invention, the foregoing objects are attained by providing an abnormal display apparatus for a low temperature storage house having a temperature sensor for detecting an internal temperature of the storage house, a cooling apparatus for cooling the interior of the storage house, and a cooling control means for repetitively controlling the cooling apparatus based on the internal temperature detected by the temperature sensor therefor. There cooling control means is also for maintaining the internal temperature in a value between predetermined upper and lower limit temperatures therefore. A display means is provided for indicating the internal temperature detected by the temperature sensor in the form of letters therefor. The abnormal display apparatus includes:

abnormal detection means for detecting the plural kinds of abnormalities respectively occurring in the low temperature storage house;

abnormal data forming means for forming abnormal data indicative of each of the abnormal kinds in accordance with the kinds of abnormalities detected by the abnormal detection means; and display control means for applying each of the abnormal data formed by the abnormal data forming means and the internal temperature data indicative of the internal temperature respectively to the display means at lapse of a predetermined time such that the display means indicates the kinds of abnormalities and the internal temperature dependent on each of the abnormal data sequentially and alternately with lapse of time.

In an aspect of the present invention, there is provided an abnormal display apparatus further including abnormal data memory means for storing the abnormal data in order of occurrence of abnormalities; wherein the display control means applies the abnormal;

data memorized within the abnormal data memory means to the display means in the stored order. The display means thereby indicates the kinds of abnormalities in order of occurrence in the form of letters.

In another aspect of the present invention, there is provided an abnormal display apparatus further comprising abnormal data deletion means for deleting abnormal data indicative of abnormal situations when the abnormal data is not detected by the abnormal detection means.

In still another aspect of the present invention, there is provided an abnormal display apparatus for a low temperature storage house having a temperature sensor for detecting an internal temperature of the storage house, a cooling apparatus for cooling the interior of the storage house, cooling control means for repetitively controlling the cooling apparatus based on the internal temperature detected by the temperature sensor and for maintaining the internal temperature in a value between predetermined upper and lower limit temperatures, and display means for indicating the internal temperature detected by the temperature sensor. The abnormal display apparatus includes:

abnormal detection means for detecting the plural kinds of abnormalities respectively occurring in low temperature storage house;

writable memory means;

writing means responsive to abnormal detection of the abnormal detection means for writing abnormal data indicative of the kinds of abnormalities into the writable memory means in order of occurrence of the abnormalities;

display switchover means for switching over the internal temperature indication state of the display means into an abnormal indication state;

advance manipulation means for advancing read addresses for the writable memory means step by step; and read means for reading out each abnormal data from the writable memory means in order of the occurrence on a basis of the address advanced by the advance manipulation means when the indication state of the display means has been switched over into the abnormal indication state by the display switchover means and for applying each read out abnormal data to the display means such that the display means indicates the abnormal kinds corresponding to the abnormal data.

In still another aspect of the present invention, there is provided an abnormal display apparatus further comprising clear manipulation means responsive to actuation thereof for clearing the abnormal data within the writable memory means.

BRIEF DESCRIPTION OF THE DRAWINGS

Other objects, features and advantages of the present invention will be readily appreciated from the following detailed description of preferred embodiments thereof when considered with reference to the accompanying drawings, in which.

DESCRIPTION OF THE PREFERRED EMBODIMENTS

Figure 1:
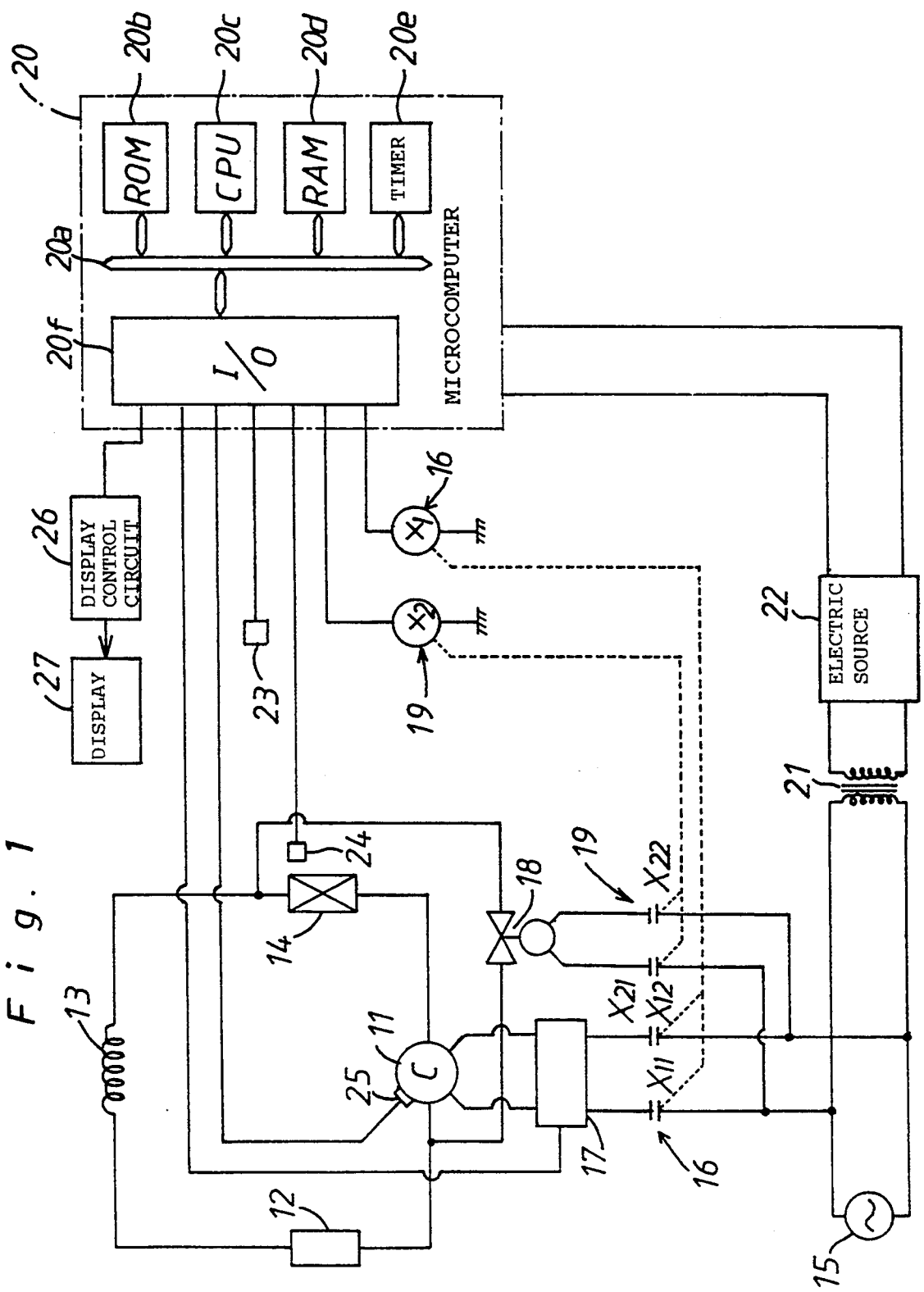
FIG. 1 is a block diagram of a low temperature storage house showing a first embodiment of the present invention.
Figure 2:
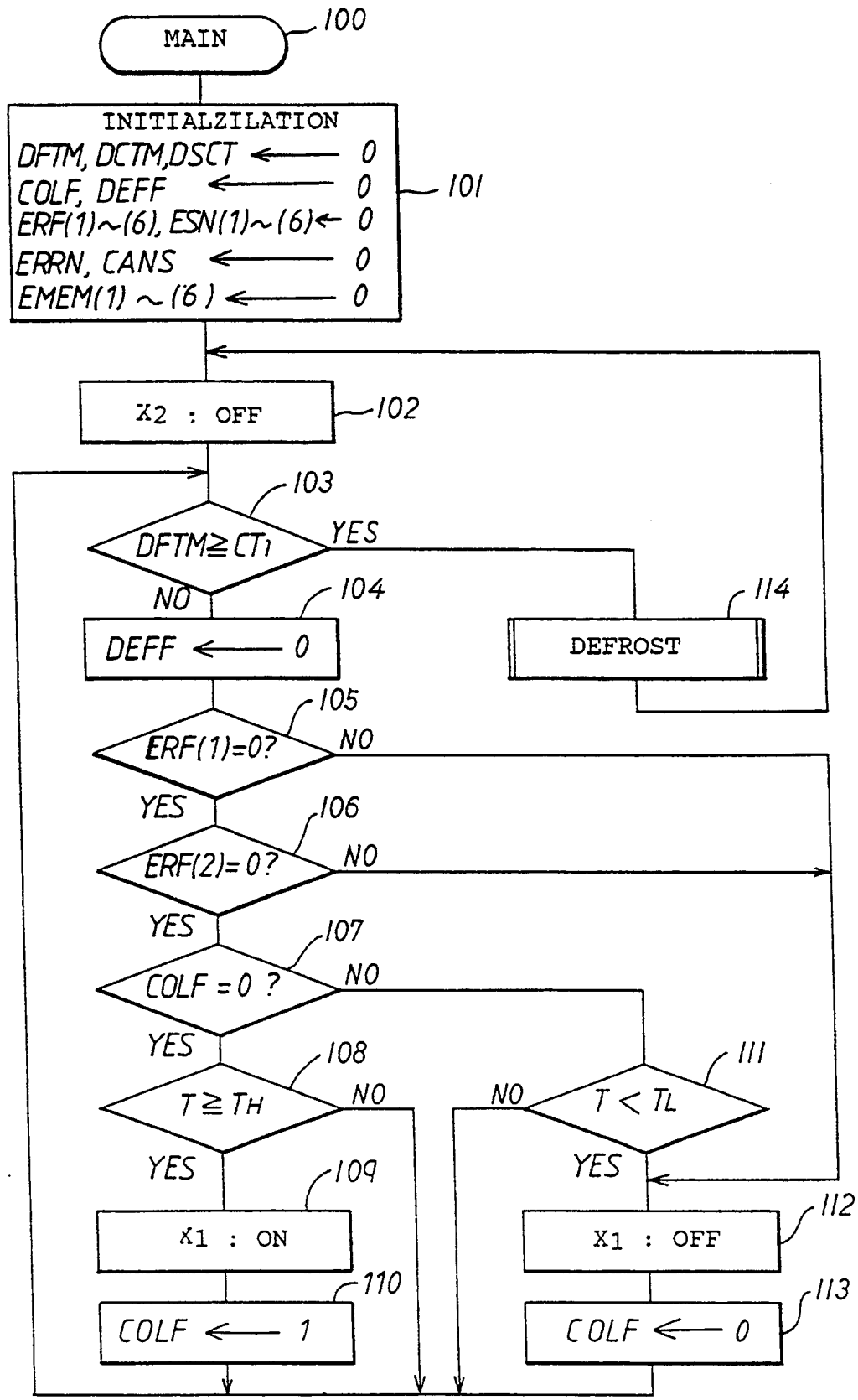
FIGS. 2-9 are flow charts of a program executed by the microcomputer of FIG. 1.

Hereinafter, a first embodiment in accordance with the present invention is described with reference to the drawings. FIG. 1 schematically illustrates the construction of a low temperature storage house, such as a refrigerator, a freezer, or the like according to the first embodiment. The low temperature storage house is provided with an electromotive compressor 11, a condenser 12 and a capillary tube 13 which are arranged outside the storage house. The low temperature storage house is also provided with a refrigeration circuit having an evaporator 14 arranged in the storage house. Refrigerant compressed by the compressor 11 is circulated through the condenser 12 and the capillary tube 13 to the evaporator 14 which cools the interior of the storage house. The compressor 11 is supplied with electric power from an alternating current power source 15 through normally open switches X11, X12 of a relay 16 and an overload relay 17. The normally open switches X11, X12 are closed by being supplied electric power to a coil X1 of the relay 16, and are opened by discontinuing the electric power supply to the coil X1. The overload relay 17 is usually maintained in a closed condition and is opened to cause the circuit to be broken in response to flow of an abnormally large current.

An electromagnetic valve 18 is interposed between an outlet of the compressor 11 and the upstream of the evaporator 14. The valve 18 is opened to supply hot gas from the compressor 11 to the evaporator 14 when energized. The valve 18 is connected to the alternating current power source 15 through normally open switches X21, X22 of a relay 19. Thus, the valve 18 is opened upon the power supply and inversely closed upon break from the power supply. The normally open switches X21, X22 of the relay 19 are closed by energization of a coil X2 of the relay 19 and opened by deenergization of the coil X2 of the relay 19.

Energization or deenergization of these coils X1, X2 is controlled by a microcomputer 20 forming an electric control circuit. The microcomputer 20 is supplied with a direct current voltage from a power source circuit 22 which is connected to the power source 15 through a transformer 21. Thus, the microcomputer 20 is operated in response to the direct current voltage supplied thereto. In addition, the direct current voltage is supplied to a display control circuit 26 and display 27 which are described later. The microcomputer 20 is provided with a ROM 20b, a CPU 20c, a RAM 20d, a timer 20e and an I/O 20f which are connected to a bus 20a. The ROM 20b stores therein a program corresponding to a flow chart shown in FIGS. 2 to 9. The CPU 20c runs the program. The RAM 20d stores temporarily therein variables necessary for executing the program. In the RAM 20d, an abnormal data memory EMEM(i)(i=1-6) is provided to store therein error codes EC1-EC6 which are indicative of abnormal situations of the low temperature storage house. The timer 20e measures time to output a timer interrupt signal at each lapse of a predetermined time, for instance, 1 (msec.). I/O 20f is connected to the coils of the relays 16,19, temperature sensor 23, thermo-switches 24, 25, display control circuit 26, the display 27 and overload relay 17 to receive and supply signals to and from these devices.

The temperature sensor 23 is mounted in a suitable interior portion of the refrigerator or the freezer to detect a temperature within the interior of the refrigerator or the freezer and to output a detecting signal indicative of the detected temperature. The thermo-switch 24 is constructed by a temperature sensing switch which is mounted on the evaporator 14. Thus, the thermo-switch 24 is maintained in an ON state or condition under normal or cooling operation and is switched over into an OFF state or condition upon rise of a temperature up to a temperature for completing defrost by the evaporator 14 to output a signal indicative of the ON or OFF condition. The thermo-switch 25 is constructed by a temperature sensing switch which is mounted on a casing of the compressor 11. The thermo-switch 25 is maintained in an ON condition under normal operation and is switched over into an OFF condition upon rise of a temperature of the compressor casing up to an abnormally high temperature to output a signal indicative of the ON or OFF condition. The display 27 is in the form of, for instance, a liquid crystal display for displaying characters composed of English numerals and is controlled by the control circuit 26 to display these characters. The overload relay 17 is arranged to output a signal indicative of an ON or an OFF condition.

Hereinafter, explained is operation of the first embodiment as described above. When a power switch (not shown) is actuated, the CPU 20c starts to perform execution of the program at step 100 of FIG. 2. Then, the CPU 20c initially sets various variables DFTM, DCTM, DSCT, ESN(1) to ESN(6), ERRN, CANS, various flags COLF, DEFF, ERF(1)-ERF(6) and abnormal data memory EMEM(1)-EMEM(6) to zero. Thereafter, the CPU 20c performs a circulating execution at steps 102 to 114. During the circulating execution, the CPU 20c releases energization of the coil X2 of relay 19 at step 102. Then, the normally open switches X21, X22 of the relay 19 are opened by release of energization of the coil X2 to set the electromagnetic valve 18 into deenergization wherein the evaporator 14 may not be supplied at its upstream portion with hot gas.

After execution at step 102, the CPU 20c determines at step 103 as to whether or not the timer count value DFTM has been counted up. This means that whether or not the count value DFTM has reached a predetermined value (for instance a value indicative of about 6 to 8 hours) is determined at step 103. At this stage, the defrost timer count value DFTM is set initially into zero. Thus, an answer is determined "NO" at step 103, and the CPU 20c sets the defrost flag DEFF into zero at step 104 to advance the program.

Firstly, described is a case wherein no abnormalities have yet occurred in the low temperature storage house and the abnormal flags ERF(1) to ERF(6) are set to zero. When answers are determined "YES" at steps 105, 106 in sequence, the CPU 20c determines at step 107 "YES" on a basis of the cooling flag COLF which has been initially set into zero. Then at step 108, the CPU 20c is applied with a detection signal indicative of a temperature T within the storage house to determine whether the temperature T is equal to or higher than a predetermined upper limit temperature TH. The upper limit temperature TH is, for instance, $-2°$ C. in case of the refrigerator and is, for instance, $-17°$ C. in case of the freezer. At this stage, the temperature within the low temperature storage house is maintained equal to or higher than the upper limit temperature TH immediately after actuation of the power switch. Thus, the CPU 20c determines "YES" at step 108 and supplies the coil X1 of the relay 16 with electric energy at step 109 to change the cooling flag COLF to zero at step 110. As a result, the normally open switches X11, X12 of the relay 16 are maintained in their closures, and the compressor 11 is supplied with the electric power from the alternating current source 15 so that it starts to operate and to supply the evaporator 14 with cooled refrigerant so as to start cooling the interior of the storage house.

After return of the program to the step 103, the CPU 20c performs execution at steps 104-106 and thereafter determines at step 107 "NO" based on the cooling flag COLF which has already changed to "1". Then, the CPU 20c determines at step 111 whether the temperature T detected by the temperature sensor 23 is less than a predetermined temperature TL. The lower limit temperature TL can be for instance, $-4°$ C. in case of the refrigerator and can be, for instance, $-19°$ C. in case of the freezer. At this stage, the temperature within the low temperature storage house is maintained equal to or higher than the lower limit temperature TL immediately after actuation of the power switch. Thus, the CPU 20c determines at step 111 "NO" to return the program to step 103. Hereinafter, circulating execution at steps 103-107, 111 is repetitively performed. During the circulating execution, the coil X1 of the relay 16 is continuously energized and the evaporator 14 cools continuously the interior of the storage house to gradually lower the temperature T within the storage house.

When the interior temperature T lowers down to less than the lower limit temperature TL, The CPU 20c determines "YES" at step 111, release the coil X1 of the relay 16 from its energization at step 112 and then changes the cooling flag CFLG into "0" at step 113. Thus, the normally open switches X11 and X12 of the relay 16 are deactivated, the alternating current source 15 stops the power supply to the compressor 11, and the compressor 11 is deactivated to stop cooling of the interior of the storage house by the evaporator 14. As a result, the interior temperature T starts to rise. When the program returns to the step 103, execution at steps 104-106 is performed and an answer is determined "YES" at step 107 based on the cooling flag COLF which has already been set into "0". Thus, the CPU 20c performs repetitively circulating execution at steps 103-108 until the interior temperature T becomes equal to or higher than the upper limit temperature TH. When the interior temperature T becomes equal to or higher than the upper limit temperature TH, the CPU 20c determines at step 108 "YES" to perform execution at steps 109, 110, as previously described, during which the evaporator 14 starts to cool the interior of the storage house. Activation and deactivation of the cooling apparatus are repetitively controlled by circulating execution of the CPU 20c through the steps 103-108 to maintain the interior temperature T in a value between the high and low limit temperatures TH and TL.

Figure 4:
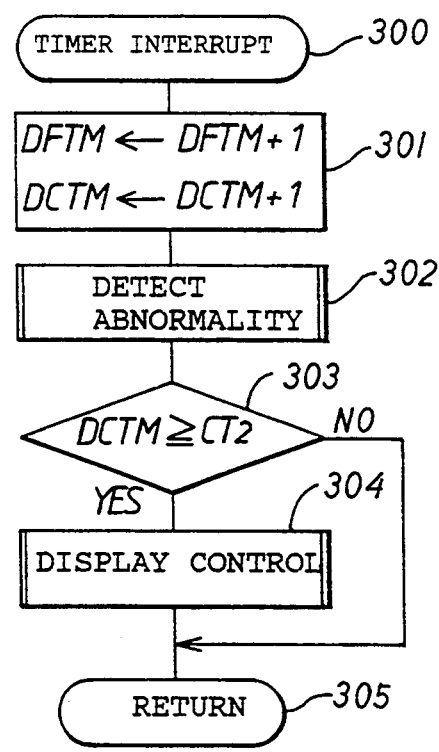

During circulating execution of steps 103-113, the CPU 20c performs execution of a timer interrupt program composed of steps 300-305 shown in FIG. 4 at each lapse of a predetermined time (about 1 msec.). In each execution of the timer interrupt program, the display switch-over timer count value DCTM is incremented by "1", whether or not the count value DCTM is equal to or larger than a predetermined value CT2 (corresponding to about 1 sec.). When the same count value DCTM becomes equal to or larger than the predetermined value CT2, an answer is determined to be "YES" at step 303, and execution of a display control routine is started at step 600 shown in FIG. 9. Furthermore, the timer count value DCTM is cleared "0" at step 609 of the display control routine. Thus, the display control routine is executed at a lapse of about 1 (sec.).

in execution of the display control routine, the abnormal occurrence number ERRN of the low temperature storage house has been initially set into "0", and the display order count value DSCT is set into "0" when it becomes larger than the abnormal occurrence number ERRN (=0) through execution of steps 601, 602. Thus, the display order count value DSCT is always held "0". During circulating execution of steps 103-113(see FIG. 2), the defrost flag DEFF is continuously set into "0" at step 104. Then, an answer is determined "YES" respectively at steps 603, 604 after execution at steps 601, 602. When the program proceeds to step 605, display data indicative of the interior temperature T detected by the temperature sensor 23 is applied to the display control circuit 26 which controls the display 27. Then, the display 27 indicates the interior temperature T in the form of numeral representation, for instance, "$-3°$ C.". As a result, the interior temperature T may be indicated by the display 27 with the character representation in case activation and deactivation of the cooling apparatus are repetitively controlled by means of the circulating execution of steps 103—113.

When the defrost timer count value DFTM becomes equal to or larger than a predetermined value CT1 (corresponding to about 6-8 hours) under execution at step 301 of the timer interrupt program during circulating execution of steps 103-113, the CPU 20c determines "YES" at step 103 to perform a defrost routine at step 114. At the defrost routine, the defrost flag DEFF is set into "1" at step 201 of FIG. 3, and an answer is thereafter determined "YES" in sequence at steps 202, 203 based on the abnormal flags ERF(1), ERF(2) which have been initially set into zero. Thus, circulating execution of the steps 202–205 is performed during ON state of the thermo-switch 24, and the coil X1 of relay 16 and the coil X2 of relay 19 are continuously energized by execution at step 204. Thus, the normal open switches X11, X12 of the relay 16 are set into ON state respectively, and the normal open switches X21, X22 of the relay 19 are also set into ON state respectively. As a result, the compressor 11 and the electromagnetic valve 18 are supplied with electric power from the alternating current source 15 to apply hot gas therefrom to the upstream of the evaporator 14 through the electromagnetic valve 17. This causes the temperature of the evaporator 14 to rise.

Figure 3:
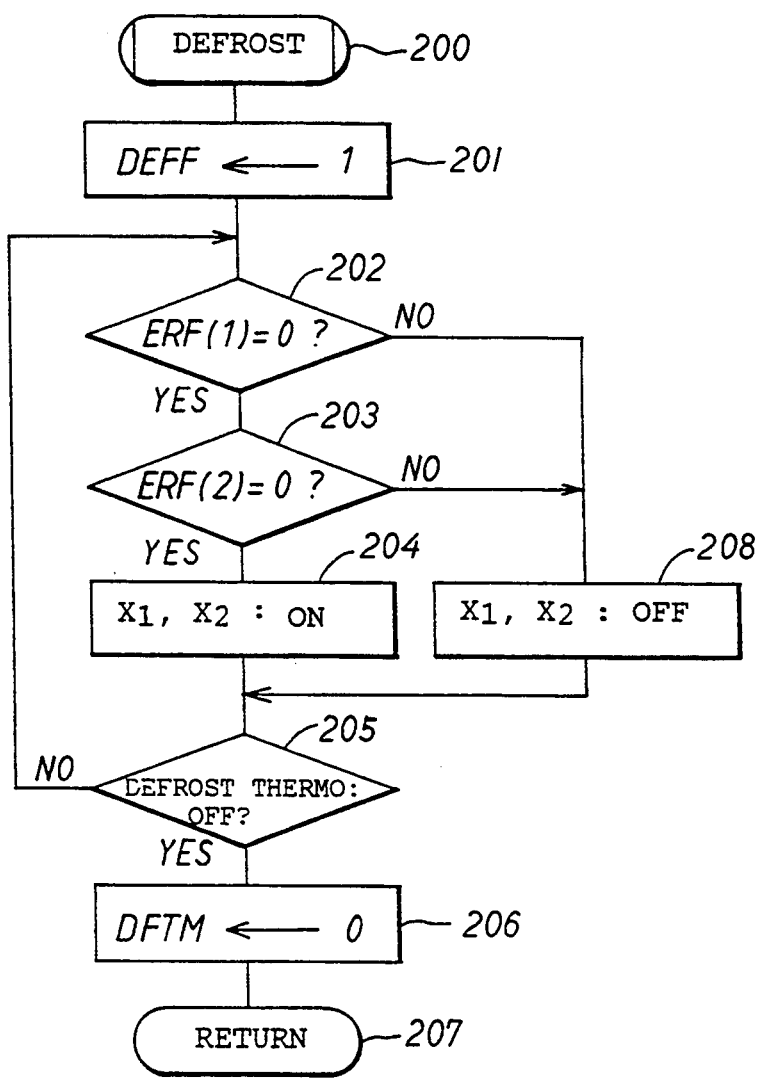
Figure 9:
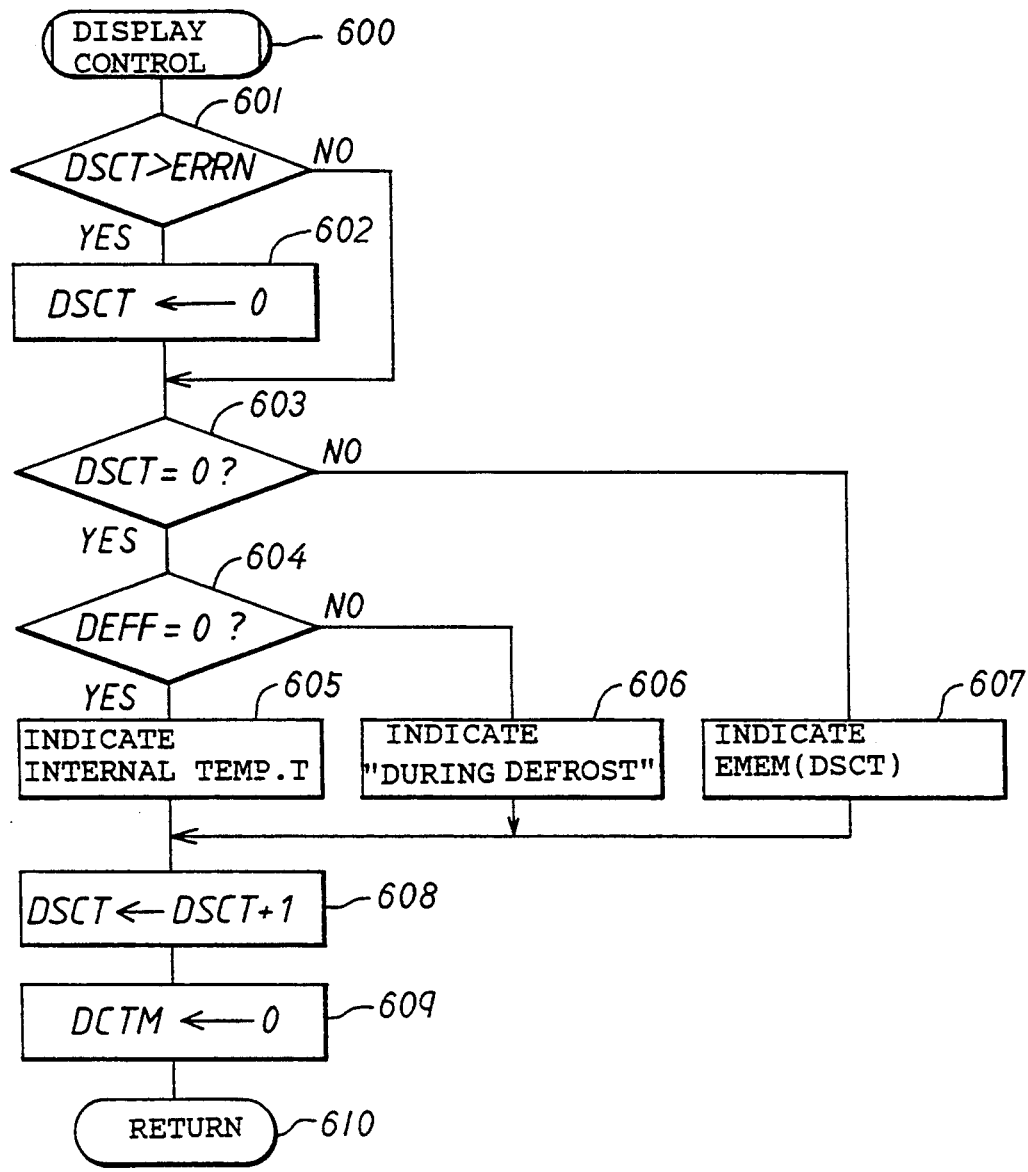

Furthermore, during the circulating execution of the steps 202–205, the timer interrupt program of FIG. 4 is executed at a predetermined time (about 1 milisec.), and the display control routine of FIG. 9 is executed at a predetermined time (about 1 sec.), as previously described. In this case, the defrost flag DEFF is set into "1" at step 201(FIG. 3). Thus, an answer is determined "NO" at step 604, and display data for displaying defrost is applied to the display control circuit 26 as step 606. As a result, the display 27 is controlled by the display control circuit 26 based on the display data to indicate defrosting in the form of characters (for instance "dF").

Then, such a supply control of hot gas to the evaporator 14 causes the temperature of the evaporator 14 to rise, and frost adhered to the evaporator 14 is gradually released. When the temperature of the evaporator 14 rises up to a value sufficient to release frost of the evaporator 14, the defrost thermo-switch 24 is turned off. At this stage, during circulating execution of steps 202–205 of FIG. 3, the CPU 20c determines "YES" at step 205, sets initially the defrost timer count value DFTM into "0" at step 206 and finishes execution of the defrost routine at step 207. The CPU 20c returns the program to step 102 of FIG. 2 due to ending of the defrost routine and again performs the circulating execution of steps 103–113 to start repetitive control in activation and deactivation of the cooling apparatus.

If the low temperature storage house malfunctions, abnormalities are detected at step 302 or abnormal detection routine of the timer interrupt program of FIG. 4. Firstly, described is a case that where overload relay 17 is deenergized due to flow of an excessive current into the compressor 11.

When the overload relay 17 is deenergized, as previously described, the CPU 20c which has started execution of program determines "YES" at step 401, determines "NO" based on an abnormal flag EFR(1)=0 at step 402 and adds "1" to the abnormal occurrence number ERRN at step 403 to set the abnormal occurrence order ESN(1) into a value indicated by the abnormal occurrence number ERRN. Then, a predetermined error code EC1 is written at step 405 into a memory location EMEM(ERRN) of abnormal data memory EMEM appointed by the abnormal occurrence number ERRN, and the abnormal flag ERF(1) is set into "1" at step 406 to advance the program to step 412 and thereafter. In addition, the error code EC1 indicates flow of an over current into the compressor 11. In the abnormal detection routine, the "YES" answers are determined at steps 401,402 in sequence to advance the program to step 412, so far as the abnormality continues.

Next, explained is the case where the temperature of the compressor 11 rises extremely. In this case, the ease thermo-switch 25 is turned off. Thus, the CPU 20c determines "YES" at step 412 and also determines "NO" or EFR(2)=0 at step 413. During execution of steps 414 to 417, "1" is added to the abnormal occurrence number ERRN, the abnormal occurrence order ESN(2) is set into a value indicated by the abnormal occurrence number ERRN, a predetermined error code EC2 is written into the memory location EMEM(ERRN),and an abnormal flag ERF(2) is set into "1" to advance the program to step 423 and thereafter. In addition, the error code EC2 indicates that the temperature of the compressor 11 becomes extremely high. So far as the abnormality continues, an "YES" answer is determined at steps 412, 413 in sequence to advance the program to step 423 of FIG. 6.

When the abnormal flag ERF(1) is set into "1" due to deenergizatlon of the over load relay 17 or the abnormal flag ERF(2) is set into "1" due to the high temperature of the compressor 11, as previously described, a "NO" answer is determined at steps 105, 106 in sequence to release energization of the coil X1 of the relay 16 with execution at step 112, during intermittent operation of the compressor 11 caused by circulating processing of steps 103 to 113. When the abnormal flags EFR(1), EFR(2) are set into "1", during defrost control caused by circulating processing at steps 202 to 205 of FIG. 3, a "NO" answer is determined at steps 202, 203 in sequence and execution at step 208 is performed to release energization of the coils X1, X2 of relays 16, 17. As a result, operation of the low temperature storage house is stopped in case the overload relay 17 is deenergized or the temperature of the compressor 11 becomes high.

With intermittent operation of the cooling apparatus caused by circulating processing at steps 103 to 113, the internal temperature T of the storage house should be originally maintained in a temperature of −4° C. to −2° C., whereas the internal temperature T of the refrigerator house should be maintained in a temperature of −19° C. to −17° C. However, when the internal temperature T becomes equal to or higher than a predetermined temperature THH (+2° C. for the storage house and −13° C. for the refrigerator house) due to any reasons or the internal temperature T becomes lower than a predetermined temperature TLL (−2° C. for the storage house and −23° C. for the refrigerator house) due to any reasons, the abnormality is detected with processing at steps 423 to 428 and steps 434 to 439. Then, "1" is added to the abnormal occurrence number ERRN, the abnormal occurrence order ESN(3), ESN(4) are set into a value indicated by the abnormal occurrence number ERRN, predetermined error codes EC3, EC4 are written into the memory location of the abnormal data memory EMEM, and the abnormal flags ERF(3), ERF(4) are set into "1".

Figure 7:
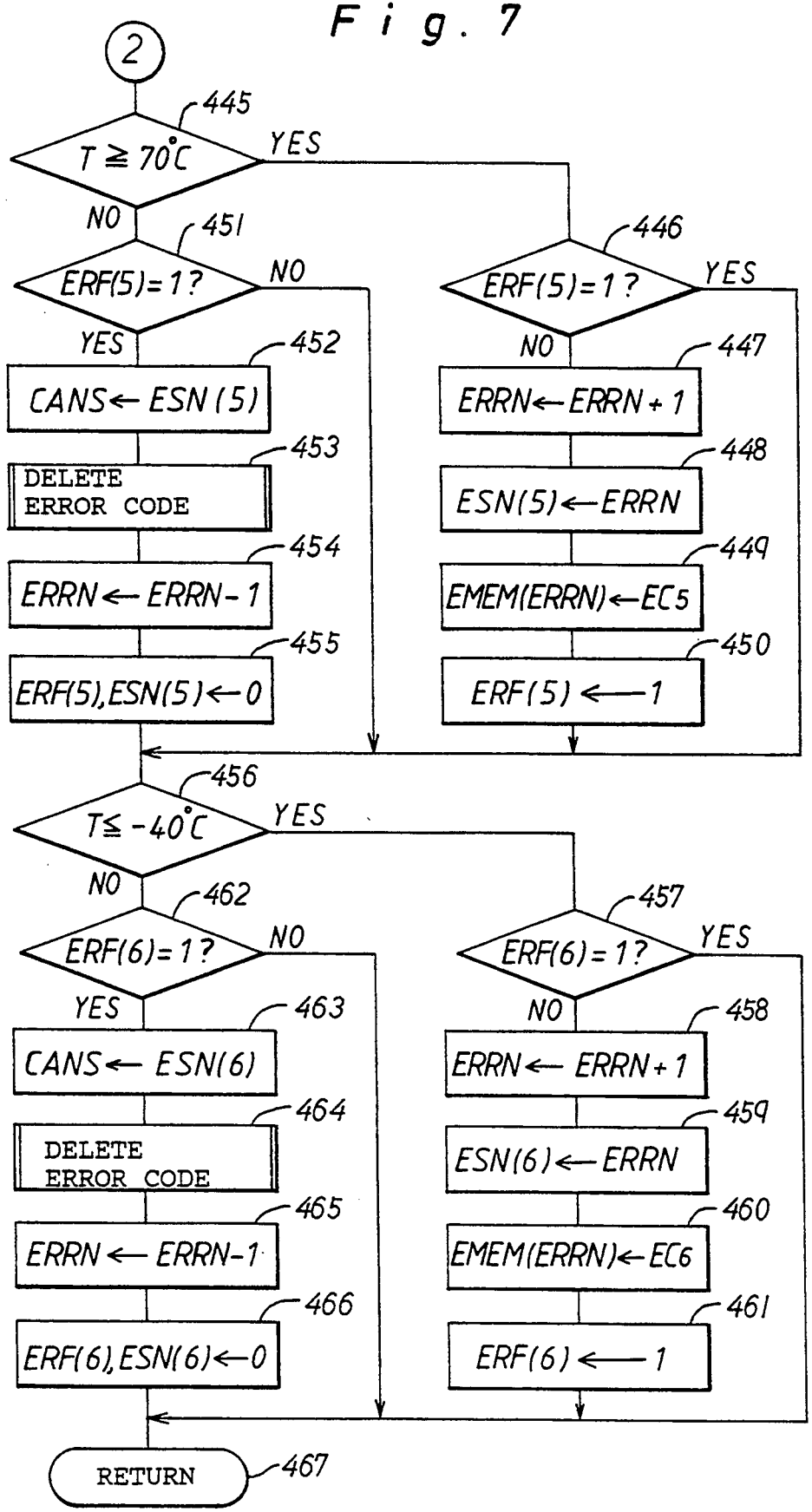

Furthermore, the temperature sensor 23 is designed to output a detection signal indicative of +70° C. due to disconnection of the temperature sensor 23, and the temperature sensor 23 is designed to output a detection signal indicative of −40° C. due to a short of the temperature sensor 23. Therefore, execution at steps 445 to 450 or steps 456 to 461 of FIG. 7 is performed due to a short or disconnection of the temperature sensor 23 to detect a short or disconnection of the temperature sensor 23. Then, "1" is added to the abnormal occurrence number ERRN, the abnormal occurrence order ESN(5), ESN(6) are set into a value indicated by the abnormal occurrence number ERRN, predetermined error codes EC5, EC6 are written into the memory location EMEM(ERRN) of the abnormal data memory EMEM, and abnormal flags ERF(5), ERF(6) are set into "1".

When the various abnormalities of the low temperature storage house occur as previously described, the kind of each of the various abnormalities is indicated by the display 27 during execution at the display control routine 304 of a timer interrupt program shown in FIG. 4. The display control routine 304 is performed at about 1 (sec.) as previously described. With processing at steps 601,602 and 608 of FIG. 9, the display order count value DSCT is changed repetitively at about 1 (sec.) by "1" from "0" to the abnormal occurrence number ERRN. During change of the display order count value DSCT, whether the display order count value DSCT is "0" or not is determined at step 603. If the display order count value DSCT is equal to "0", execution at steps 604 to 606 is performed,as previously described. Thus, the display 27 indicates the internal temperature T in accordance with a value of the defrost flag DEFF or indicates "dF" during defrosting.

If the display order count value DSCT is not equal to "0", a "NO" answer is determined at step 603, and the memory data EMEM(DSCT) within the abnormal data memory EMEM which is addressed at step 607 by the display order count value DSCT is applied to the display control circuit 26. Thus, the display control circuit 26 performs switching-over control of indication In the display 27 in accordance with the memory data EMEM(DSCT), In this case, one or a plurality of the error codes EC1 to EC6 corresponding to causes of abnormalities is stored in the abnormal data memory EMEM. Thus, the display 27 indicates in letter indication one of the error codes EC1 to EC6 which is addressed by the display order count value DSCT. Furthermore, the display order count value DSCT is changed repetitively at about 1 (sec.) by "1" from "0" to the abnormal occurrence number ERRN, as previously described. Therefore, the display 27 indicates alternately at about 1 (sec.) the internal temperature T or the letters "dF" indicative of defrosting and the error codes EC1 to EC6 indicative of the kind of the abnormalities caused in the low temperature storage house. In this case, the error codes EC1 to EC6 are indicated in order of occurrence of abnormalities, because they are stored in the abnormal data memory EMEM in the order of occurrence of the abnormalities. Thus, it is possible for an operator or repairman to simply check causes of occurrence of abnormalities in the low temperature storage house.

Hereinafter, explained is the case in which various abnormalities of the low temperature storage house have been resolved, as previously described. When the overload relay 17 is set into its ON condition based on solution of the abnormal cause, a "NO" answer is determined at step 401 of FIG. 5 and an "YES" answer is determined at step 407 on a bases of the abnormal flag ERF(1) which has been set into "1". Then, a value of the abnormal occurrence order ESN(1) is set into a cancel number CANS at step 408, and thereafter "an error code cancel routine" is performed at step 409.

Figure 8:
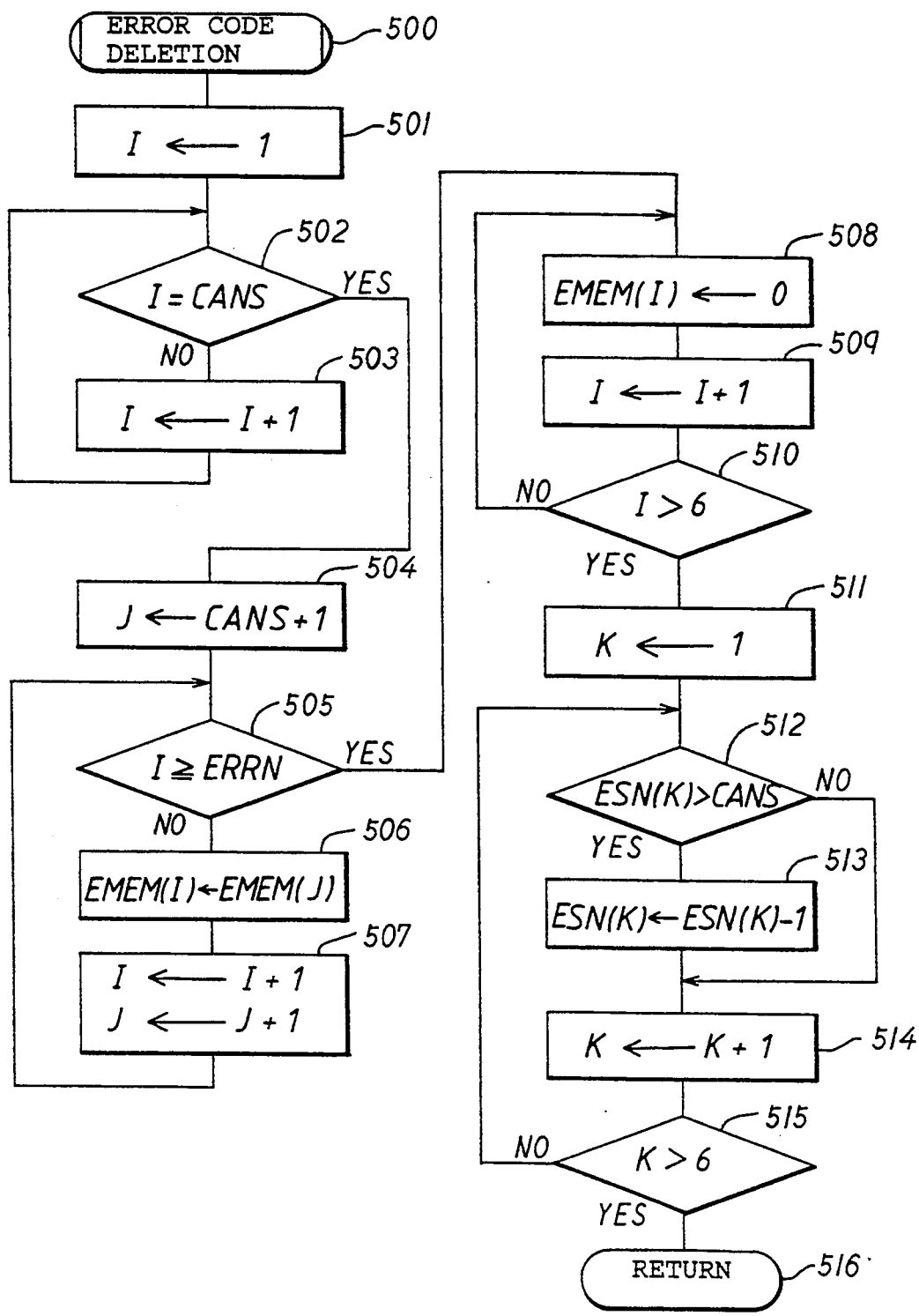

As the error code cancel routine is shown in detail in FIG. 8, execution of it is started at step 500, and a variable I is set into "1" at step 501. Thereafter, the variable I is incremented by "1" through repetitive execution of steps 502, 503 until it becomes equal to the cancel number CANS. When the variable I becomes equal to the cancel number CANS, the program is advanced to step 504 and thereafter. In this case, the cancel number CANS indicates a memory location of the abnormal data memory EMEM in which the error code EC1 related to the cancelled abnormality has been stored. The cancel number CANS is skipped to a value indicative of the memory location described above.

At step 504, a variable J is set into a value which is larger than the cancel number CANS by "1". Then, as each of the variables I,J is incremented by "1" through execution of steps 505-507, until the variable I becomes equal to the abnormal occurrence number ERRN, the memory data EMEM(J) of the abnormal data memory addressed by the variable J is read out and is written into the memory location EMEM(1) of the abnormal data memory EMEM addressed by the variable I. Thus, the error code EC1 indicative of the cancelled abnormality is cancelled from the abnormal data memory EMEM, and the error codes EC2-EC6 presented at a memory location located behind the above-mentioned cancel location are shifted forward one by one. When the variable I becomes equal to the abnormal occurrence number ERRN, an "YES" answer is determined at step 505, and the stored contents EMEM(ERRN)—EMEM(6) of the remaining abnormal data memory EMEM are cleared through execution of steps 508-510 to be zero.

In accordance with the above-mentioned cancel of the error code EC1 after such circulating processing of steps 508-510, abnormal occurrence orders ESN(2)—ESN(6) indicative of occurrence orders of abnormalities which were generated after the kinds of abnormality corresponding to the error code EC1 are corrected. That is, a variable K is sequentially increased one by one from "1" to "6" by processing of steps 511-515, and the abnormal occurrence orders which are of the abnormal occurrence orders ESN(1)-ESN(6) addressed by the variable K and are larger than the cancel number CANS are decremented by "1".

Figure 5:
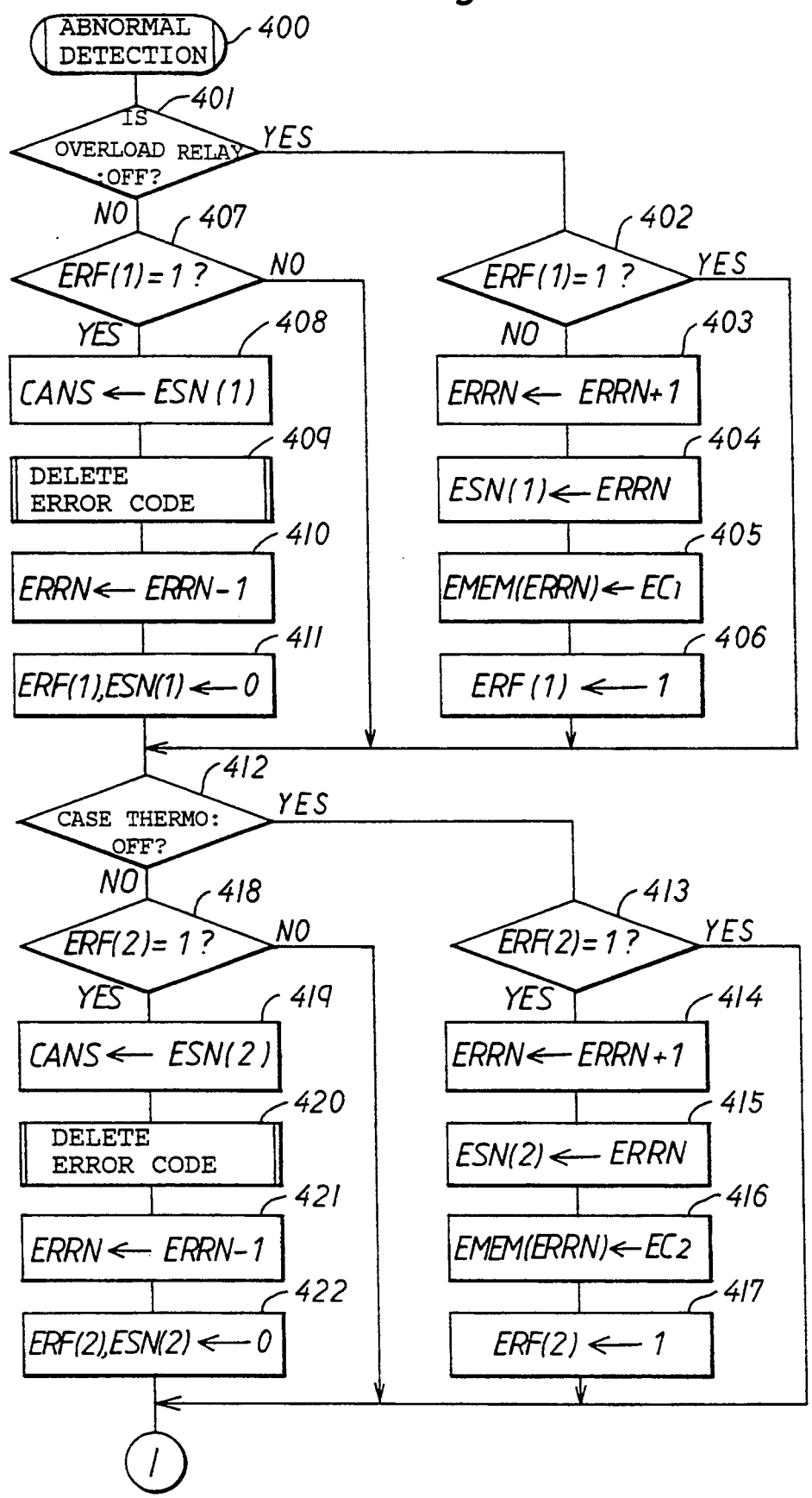
Figure 6:
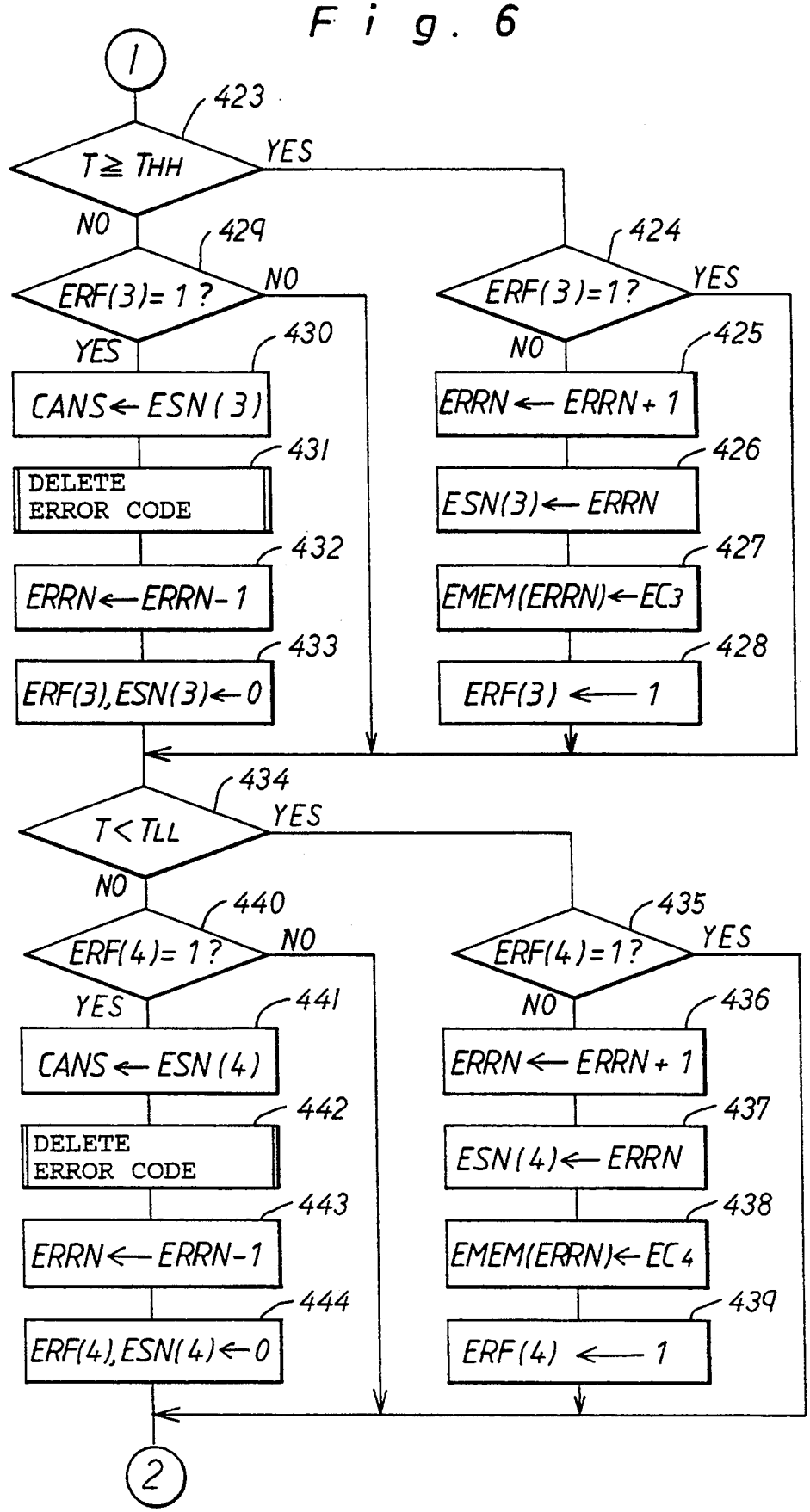

After the circulating processing of these steps 511-515, the execution of the error code cancel routine is ended at step 516 to return the program to step 410 of FIG. 5. Then, the abnormal occurrence number ERRN is incremented by "1" at step 410 and the abnormal flag ERF(1) and abnormal occurrence order ESN(1) are cleared to zero at step 411.

When turning on of thermo-switch 25 is caused by lowering of temperature of the compressor 11 the internal temperature T returns to a value under the predetermined temperature THH or a value which is equal to or larger than the predetermined temperature TLL, or the temperature sensor 23 stops generation of the detecting signal indicative of +70° C. or −40° C. due to resolution of disconnection or shortage of the sensor 23. The corresponding error codes EC2-EC6 within the data memory EMEM are cancelled by the processing of steps 445, 451–455 of FIG. 5, steps 423, 429–433 of FIG. 6, steps 434, 440–444 of FIG. 6, steps 445, 451–455 of FIG. 7 and steps 456, 462–466 of FIG. 7, as previously described. Then, the abnormal occurrence number ERRN, abnormal flag ERR (2)-ERF (6) and abnormal occurrence orders ESN(1)-ESN(6) are also altered.

Figure 10:
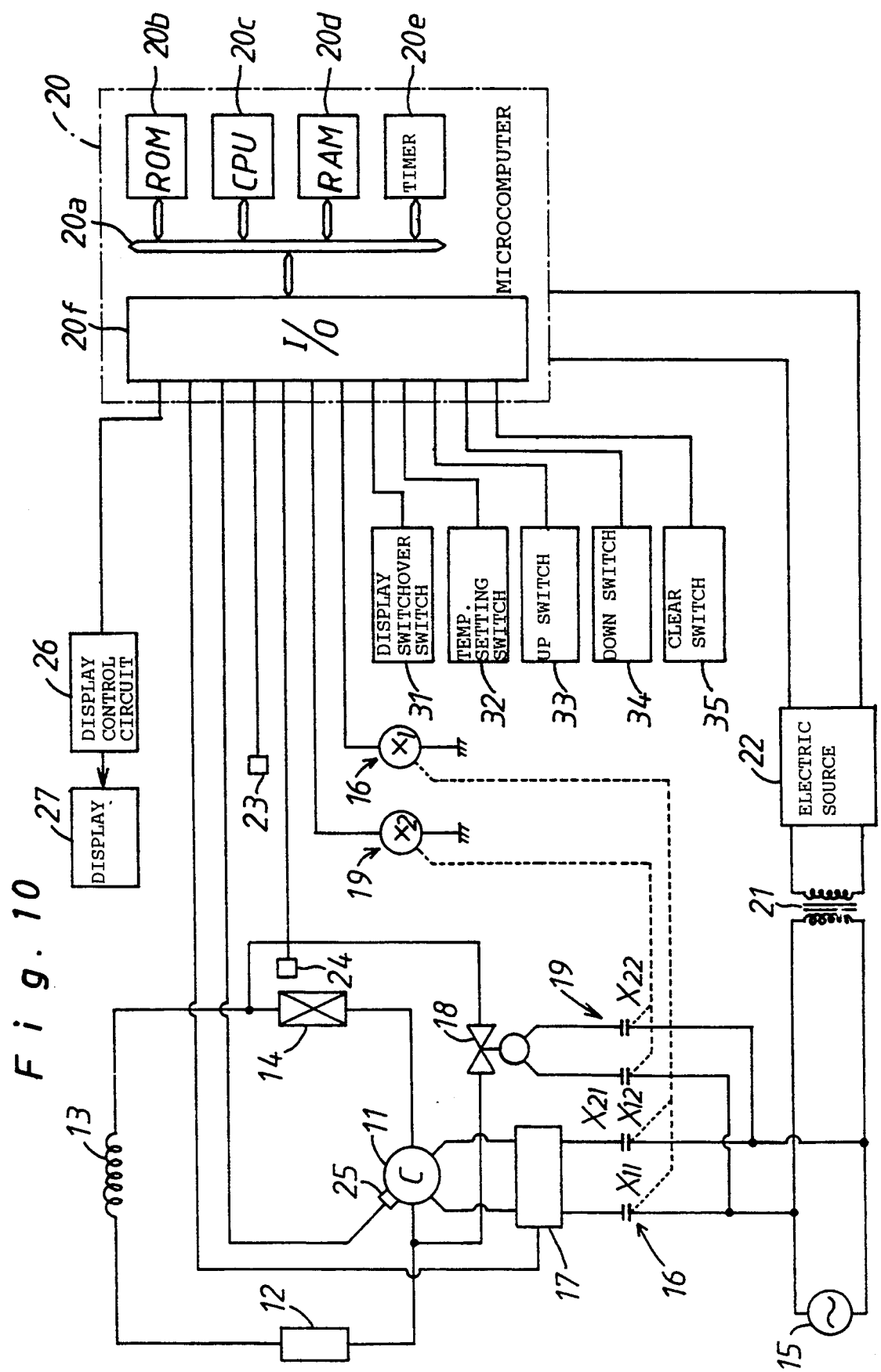
FIG. 10 is a block diagram of a low temperature storage house showing a second embodiment of the present invention.

Hereinafter, described is a second preferred embodiment in accordance with the present invention wherein a low temperature storage house is shown in FIG. 10. In the second preferred embodiment, portions common with the portions of the first embodiment are denoted by the reference characters common with them of the first embodiment, and explanations of them are therefore eliminated.

In the second embodiment, the ROM 20b stores therein a program corresponding to a flow chart of FIGS. 3, 11-18, and the CPU 20c performs the same program. The RAM 20d is provided therein with an abnormal data memory EMEM composed of a plurality of memory areas EMEM(i)(i is about 1,2, . . . ,20) which store error codes EC1-EC6 indicative of the kinds of abnormalities in the low temperature storage house. To I/O 20f, connected is the coils X1, X2 of relays 16, 19, the overload relay 17, the internal temperature sensor 23, the defrost sensor 24, the case thermo-switch 25, the display control circuit 26 and the display 27, and further connected is a display switchover switch 31, a temperature setting switch 32, an up switch 33, a down switch 34 and a clear switch 35.

The display switchover switch 31 is a switch for switching over an internal temperature indication state of the display 27 into an abnormal indication state. The temperature setting switch 32 is a switch for switching over a mode of the low temperature storage house into an internal temperature setting mode which arbitrarily alters a setting temperature Ts within the storage house. The up switch 33 and down switch 34 are switches usable for raising and lowering the setting temperature Ts at the internal temperature setting mode and are also switches usable for raising and lowering the address of the abnormal data memory EMEM at the abnormal indication state of the display 27. The clear switch 35 is a switch for clearing all the memory contents of the abnormal data memory EMEM by operation thereof.

Hereinafter, described is operation of the second embodiment. When a power switch(not shown) is turned on, the CPU 20c starts execution of the program at step 1100 of FIG. 11. Then, various variables DFTM, DCTM, ERRN, I, various flags COLF, DEFF, ERF(-1)-ERF(6) and all the memory contents of the abnormal data memory EMEM are cleared to zero and the variable J is initially set into "1". After the setting temperature Ts has been initially set into a standard temperature To ($-3°$ C. in case of the refrigerator, and $-18°$ C. in case of the freezer), the circulating execution at steps 1102-1114 is repetitively performed in the same as the circulating execution at steps 102-114. Thus, In the second embodiment, operation and stop of the cooling apparatus are repeatedly controlled by the processing of steps 1103-1113 to maintain the internal temperature between a lower temperature (Ts−1) and an upper temperature (Ts+1).

Figure 12:
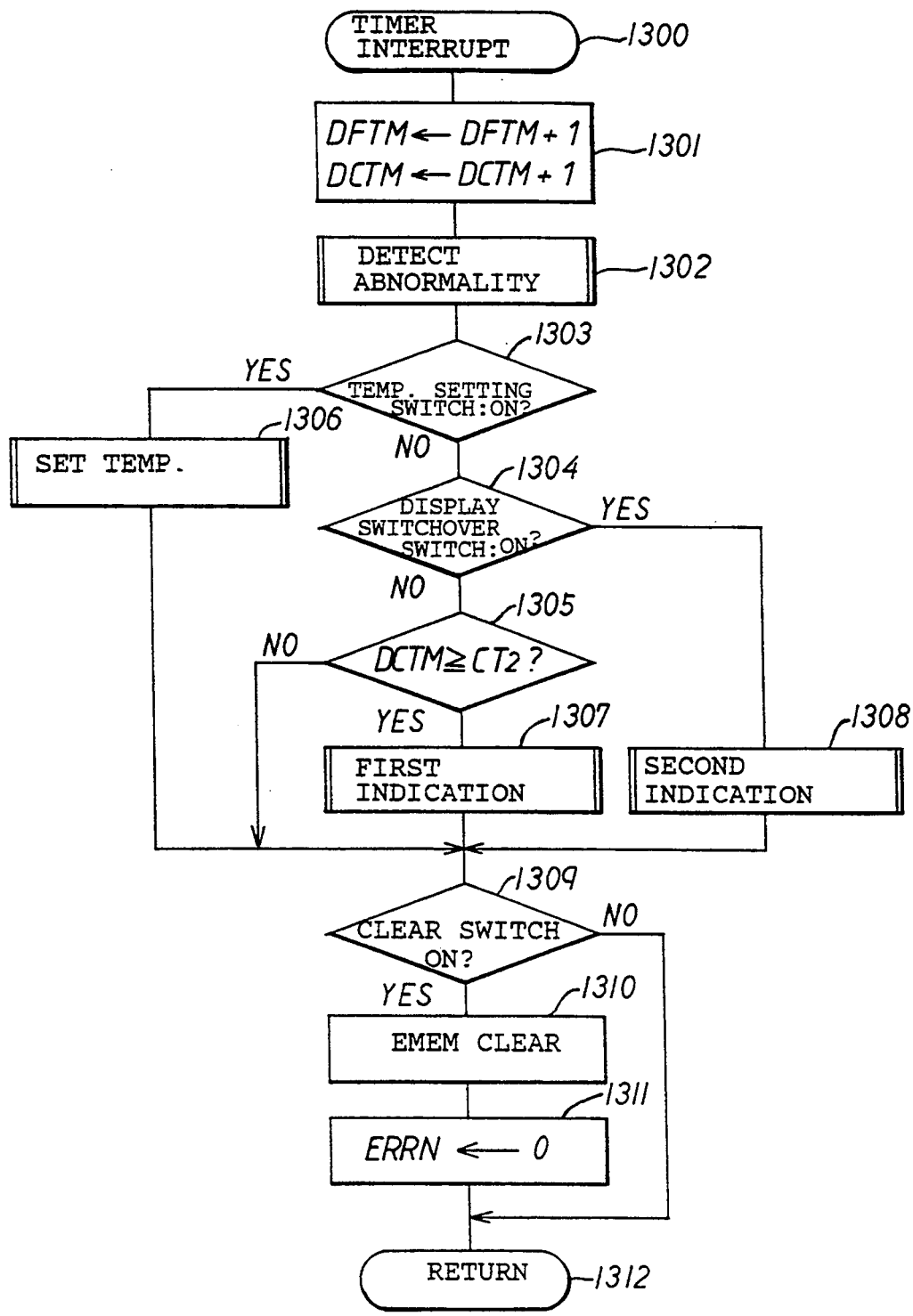

Meanwhile, during the circulating processing of steps 1103-1113, the CPU 20c performs "a timer interrupt program" composed of steps 1300-1312 of FIG. 12 at a predetermined time(about 1 millisec.). In each execution of the timer interrupt program, a display switchover timer count value DCTM is incremented by "1" at step 1301. Then, whether the display switchover timer count value DCTM is equal to or larger than a predetermined value CT2 (time corresponding to about 1 sec.) is determined at step 1305 in condition that "NO" answers are determined at steps 1303, 1304 on a basis of turning off of each of the display change-over switch 31 and temperature setting switch 32. When the count value DCTM becomes a value equal to or larger than the predetermined value CT2, an "YES" answer is determined at step 1305 to perform the first display routine at step 1307. This execution of the first display routine is started at step 1600 of FIG. 17 and the display switchover timer count value DCTM is cleared to zero at step 1613. Thus, the first display routine is performed at each lapse of about 1(sec.).

Figure 11:
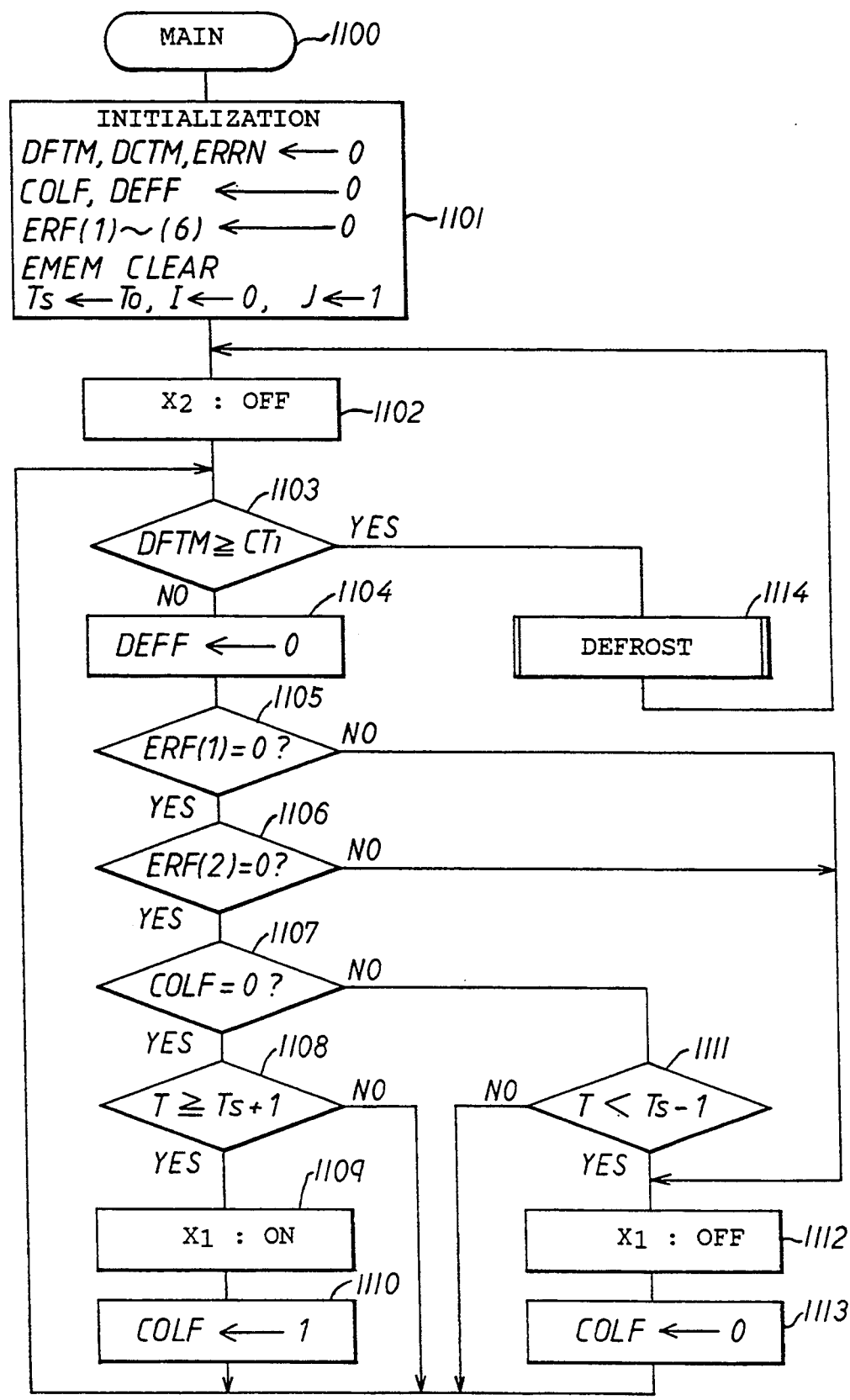
FIGS. 11-18 are flow charts of a program executed by the microcomputer of FIG. 10.

If the abnormal flags ERF(1)-ERF(6) indicative respectively of various abnormalities of the low temperature storage house are initially set to be zero in the first display routine, the variable I is altered at steps 1604-1607 to zero, even if it is not zero, and the program proceeds to step 1608. In this case, the defrost flag DEFF is continuously set to be zero at step 1104 during the circulating processing of steps 1103-1113 (FIG. 11). Thus, an "YES" answer is determined at step 1608, and display data indicative of detecting temperature T detected by the temperature sensor 23 is applied to the display control circuit 26 at step 1609. Then, the display control circuit 26 controls the display 27 based on the display control signal, and the display 27 indicates the detected temperature T in the form of numerals(for instance, "$-1.5°$ C."). Thus, the display 27 indicates the internal temperature in the form of letters, in case operation and stop of the cooling apparatus are repetitively controlled by circulating processing of steps 1103-1113.

Figure 17:
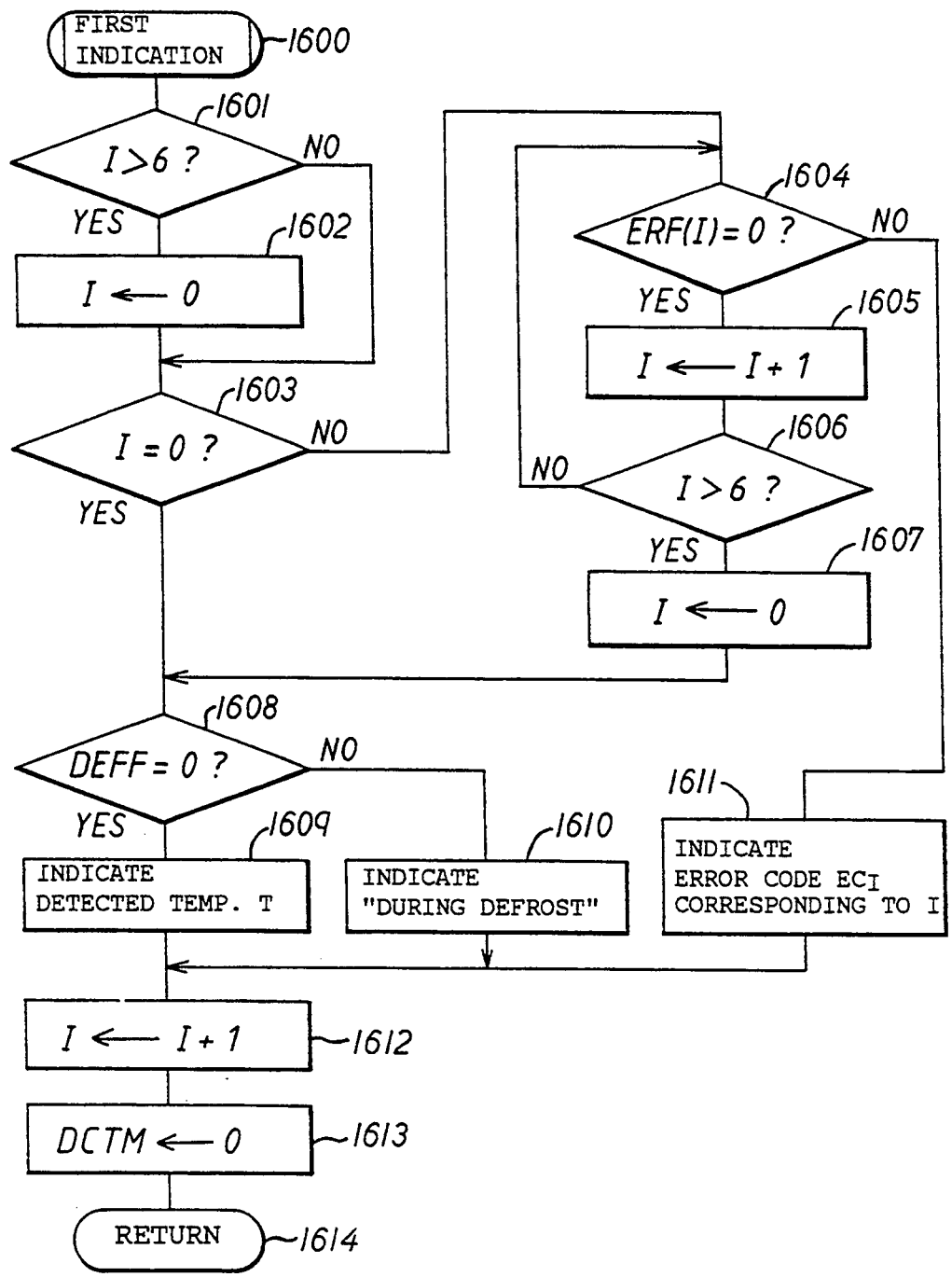

When the defrost timer count value DETM becomes equal to or larger than a predetermined value CT1(corresponding to about 6–8 hours) at step 1301 of the timer interrupt program(FIG. 12) during the circulating processing of steps 1103-1113, the CPU 20c determines "YES" at step 1103 to perform at step 1114 the defrost routine(steps 200-207 of FIG. 3) described in the first embodiment. Thus, frost attached to the evaporator 14 is defrosted by the execution of the defrost routine. Furthermore, during the circulating processing of steps 202-205 of the defrost routine of FIG. 3, the timer interrupt program of FIG. 12 is performed at each lapse of a predetermined time(1 msec.) and the display control routine of FIG. 17 is performed at each lapse of a predetermined time (about 1 sec.), as previously described. In this case, the defrost flag DEFF has been set into "1" at step 201(FIG. 3). Thus, a "NO" answer is determined at step 1608 and display data for indicating to be under defrosting is applied to the display control circuit 26. As a result, the display control circuit 26 controls the display 27 based on the display data and the display 27 indicates to be defrosting in the form of letters(for instance "dF"). After ending execution of the defrost routine, the CPU 20c returns the program to step 1102 of FIG. 11 and again starts to repetitively control operation and stop of the cooling apparatus through the circulating processing of steps 1103-1113 described above.

Hereinafter, explained is the case in which the setting temperature Ts is altered. In the case, the user turns on time temperature setting switch 32 and also turns on the up switch 33 or the down switch 34 by the desired number of times under turning on of the temperature setting switch 32. When the temperature setting switch 32 is turned on, an "YES" answer is determined at step 1303 of the timer interrupt program described above, and a temperature setting routine is performed at step 1306.

Figure 16:
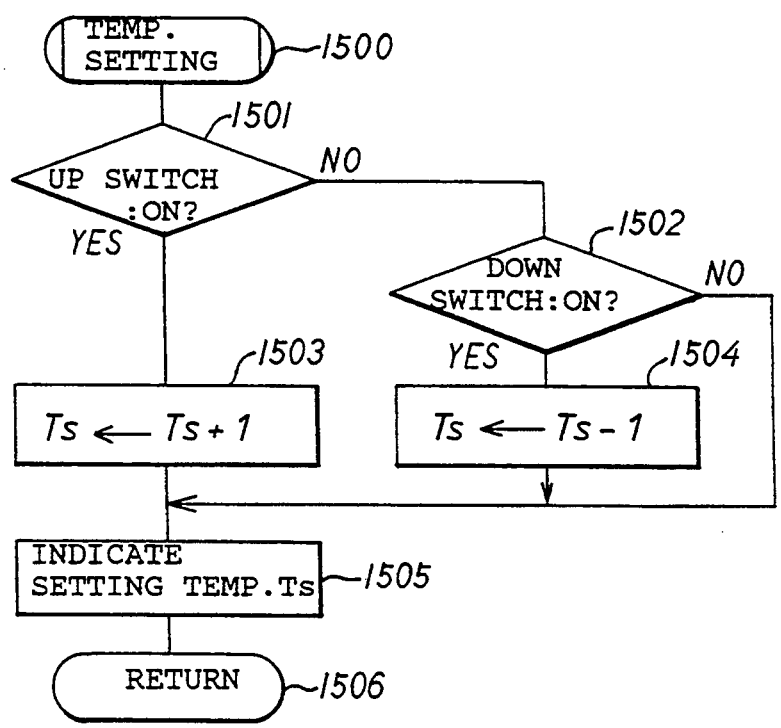

Execution of the temperature setting routine is started at step 1500 of FIG. 16 and whether the up switch 33 or the down switch 34 is turned on or not is determined at steps 1501, 1502. In this case, "NO" answers are determined at steps 1501, 1502 respectively under turning off of each of the up switch 33 and the down switch 34. Then, data indicative of the setting temperature Ts is applied to the display control circuit 26 at step 1506 and the execution of the temperature setting routine is ended at step 1506. Thus, the display 27 indicates the setting temperature Ts in replacement of the internal temperature(detected temperature T).

When the up switch 32 is turned on under turning on of the temperature setting switch 32, as previously described, an "YES" answer is determined at step 1501. Then, "1" is added to the setting temperature Ts at step 1503 and display data indicative of the added setting temperature Ts is applied to the display control circuit 26 at step 1505. When the down switch 34 is turned on under turning on of the temperature switch 33, an "YES" answer is determined at step 1502. Then, "1" is reduced from the setting temperature Ts at step 1504 and indication data indicative of the reduced setting temperature Ts is applied to the display control circuit 26 at step 1505. Thus, the setting temperature Ts is altered by actuation of the temperature setting switch 32, up switch 33 and down switch 34 and the altered setting temperature Ts is indicated by the display 27.

When the temperature setting switch 32 is released from the turning on state, a "NO" answer is determined at step 1303 of the timer interrupt program of FIG. 12 to halt execution of the temperature setting routine of step 1306. In repetitive operation and stop of the cooling apparatus, the internal temperature is maintained in a value between the upper limit temperature Ts+1 altered apart from the setting temperature Ts by 1° C. upward and the lower limit temperature Ts−1 altered apart from the setting temperature Ts by 1° C. downward.

Hereinafter, the case that an abnormality occurs. This abnormality is detected at abnormal detection of step in "timer interrupt program" of FIG. 12. Firstly, the case that the overload relay is deenergized due to flow of an excessive current into the compressor 11 is explained.

When the overload relay is deenergized, as previously described, the CPU 20c which has started execution of "the abnormal detection routine" determines "YES" at step 1401, and determines "NO" at step 1402 based on the abnormal flag ERF(1) which has been zero previously. Then, the CPU 20c adds "1" to the abnormal occurrence number ERRN, writes at step 1404 into the abnormal data memory EMEM(ERRN) an error code EC1 indicative of deenergization of the overload relay 17, and sets the abnormal flag ERF(1) into "1" at step 1405. If the above-mentioned abnormality occurs in the first time, the abnormal occurrence number ERRN is set into "1" and the error code EC1 is written into the first address EMEM(1) of the abnormal data memory EMEM. In the case that this abnormality continues, a "YES" is provided at steps 1401, 1402 in sequence and the program proceeds to step 1411. In the case that the same abnormality occurs again after the above abnormality has been resolved once, the error code EC1 is again written into the address EMEM(ERRN) which is addressed by the abnormal occurrence number ERRN within the abnormal data memory EMEM.

When the case thermo-switch 25 is turned off due to excessive rise of the temperature of the compressor 11, the CPU 20c determines "YES" at step 1411, as previously described and determines "NO" at step 1412 on a basis of the abnormal flag ERF(2) which has been zero previously. Then the CPU 20c adds "1" at step 1413 to the abnormal occurrence number ERRN, writes into the abnormal memory EMEM(ERRN) at step 1414 the error code EC2 indicative of turning off of the case thermo-switch 25 and sets the abnormal flag ERF(2) into "1" at step 1415. So far as this abnormality continues, an "YES" answer is determined at steps 1411, 1412 in sequence and the program proceeds to step 1421.

In case that the abnormal flag ERF(1) is set due to such deenergization of the overload relay 17 or the abnormal flag ERF(2) is set into "1" due to the high temperature of the compressor 11, operation of the low temperature storage house is stopped through processing of steps 1105, 1106, 1112, 1113 of FIG. 11 or processing of steps 202, 203, 208 of FIG. 3, in the same as those of the first embodiment described above.

Furthermore, the detected temperature T should be originally maintained in a temperature between the lower limit temperature (Ts−1) and the upper limit temperature (Ts+1) by intermittent operation of operation and stop of the cooling apparatus given by circulating processing of steps 1103–1113. However, when the detected temperature becomes larger than or equal to the upper abnormal temperature (Ts+5) which is higher than the setting temperature Ts by 5° C. due to any cause or under the lower abnormal temperature (Ts−5) lower than the setting temperature Ts which is lower than the setting temperature Ts by 5° C., these abnormalities are detected through processing of steps 1421–1425 and steps 1431–1435 of FIG. 14, and "1" is added to the abnormal occurrence number ERRN. Then, the error codes EC3,EC4 indicative of the abnormal high and low temperatures are between into the address EMEM(ERRN) which is addressed by the abnormal occurrence number ERRN, and abnormal flags ERF(3), ERF(4) are set into "1" respectively.

Figure 15:
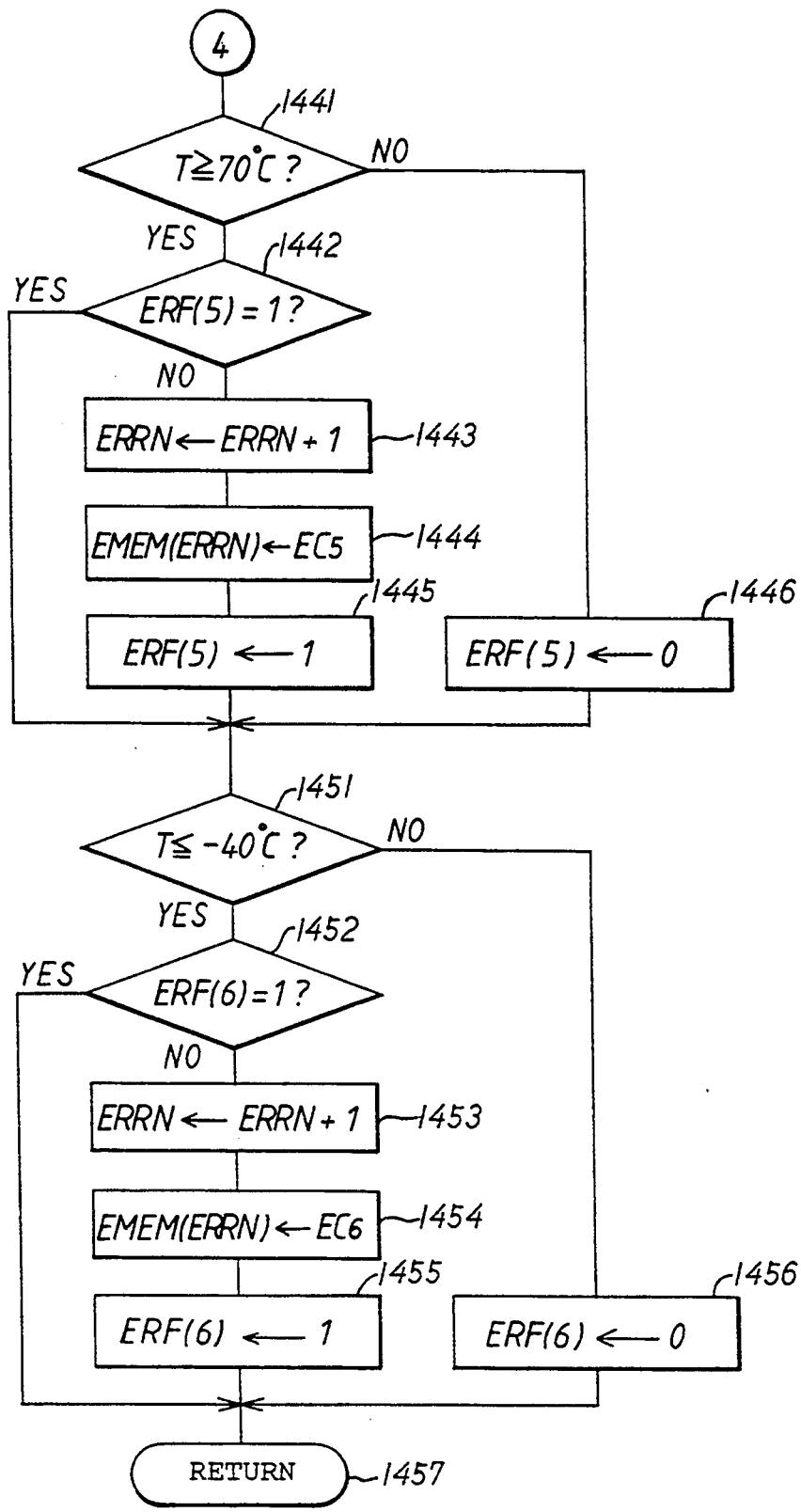

In the case that the temperature sensor 23 is disconnected or shorted, the disconnection or shortage is detected at steps 1441–1445 or steps 1451–1455 of FIG. 15, and "1" is added to the abnormal occurrence number ERRN. Then the error codes EC5, EC6 indicative of disconnection and shortage of the temperature sensor 23 are written into the address EMEM(ERRN) of the abnormal memory EMEM and the abnormal flags ERF(5), ERF(6) are set into "1" respectively.

When various abnormalities occur in the low temperature storage house, as previously described, these abnormalities are indicated by the display 27 together with the internal temperature(detected temperature T or during defrosting) at the first indication routine of step 307 of the timer interrupt program of FIG. 12. The indication control routine (FIG. 17) is performed at each lapse of about 1 sec., as previously described. In the indication control routine, the variable I changes repetitively one by one through processing of steps 1601, 1602, 1612 from zero to "6" corresponding to the number of the kinds of abnormal detections. During changes of the variable I, whether the variable I is zero or not is determined at step 1603. If the variable I is zero, the display 27 indicates the detected temperature T or "dF" during defrosting in accordance with a value of the defrost flag DEFF through processing of step 1608, as previously described.

If the variable I is not zero, a "NO" answer is determined at step 1603, and the variable I is incremented one by one from the actual value through circulating processing of steps 1604–1606 until the variable I is found out in relation to the abnormal flag ERF(1)=1. If the variable I is found out in relation to the abnormal flag ERF(1)=1, a "NO" answer is determined at step 1604 and indication data indicative of the error code EC1 corresponding to the variable I is applied at step 611 to the display control circuit 26. The display control circuit 26 controls the error indication "ECI"-(I=1,2,3 . . . ) in the display 27 in accordance with the indication data. After processing of step 1611, the variable I is incremented by "1" at step 1612 and the incremented variable I is utilized at execution of the following first indication routine. When abnormalities corresponding to the error codes EC1-EC6 have occurred in the low temperature storage house, the error codes EC1-EC6 corresponding to the abnormal flags are set into "1" through processing of steps 1405,1415,1425,1435,1445,1455 of FIGS. 13-15 and the first indication routine is performed at each lapse of about 1 (sec.), as previously described. Thus, the letters "dF" representative of defrosting or the internal temperature (detected temperature T) and the error codes EC1-EC6 indicative of the kinds of abnormalities occurred in the low temperature storage house are automatically switched over sequentially at each lapse of about 1(sec.) and indicated by the display 27.

Figure 13:
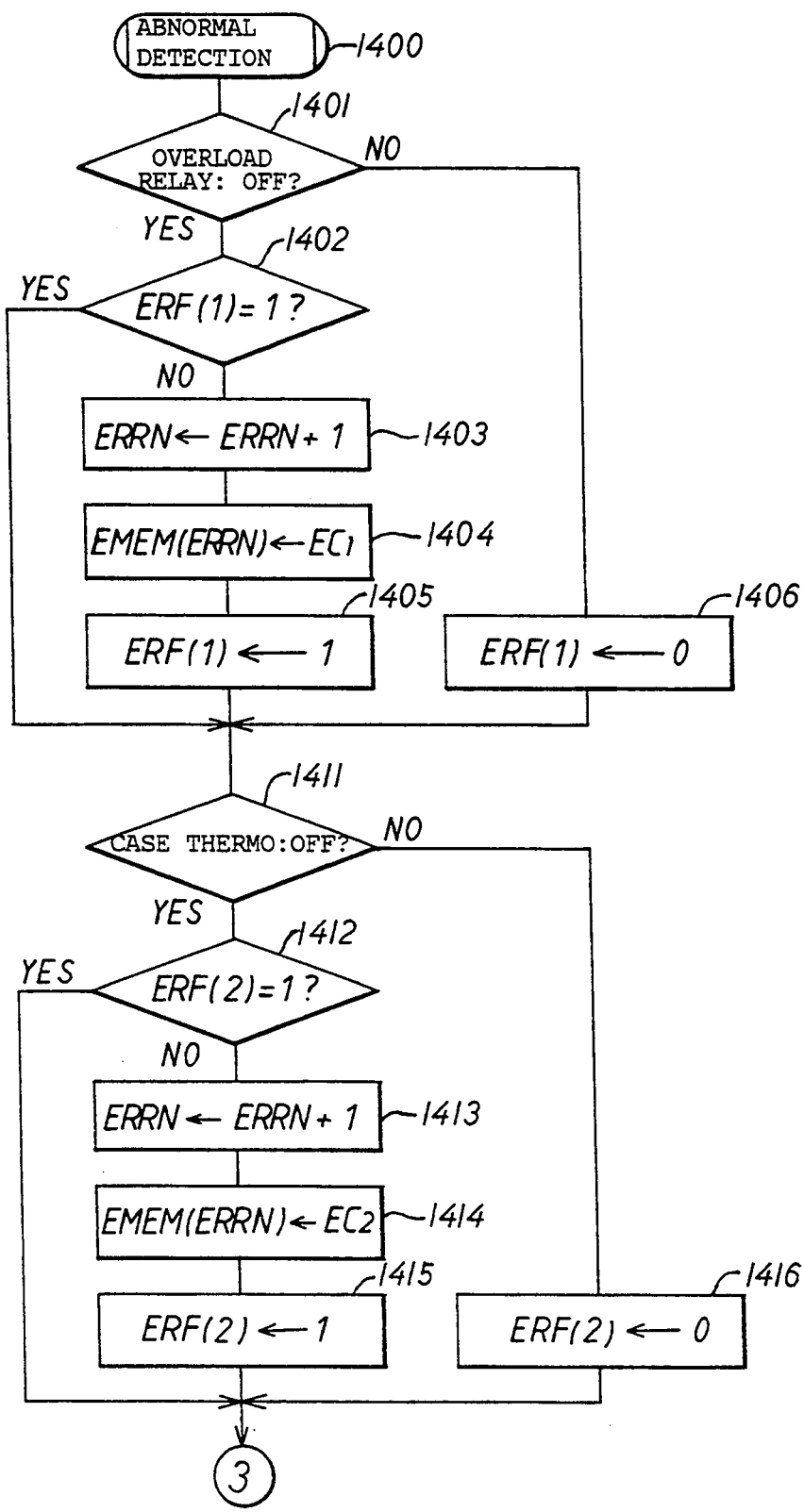
Figure 14:
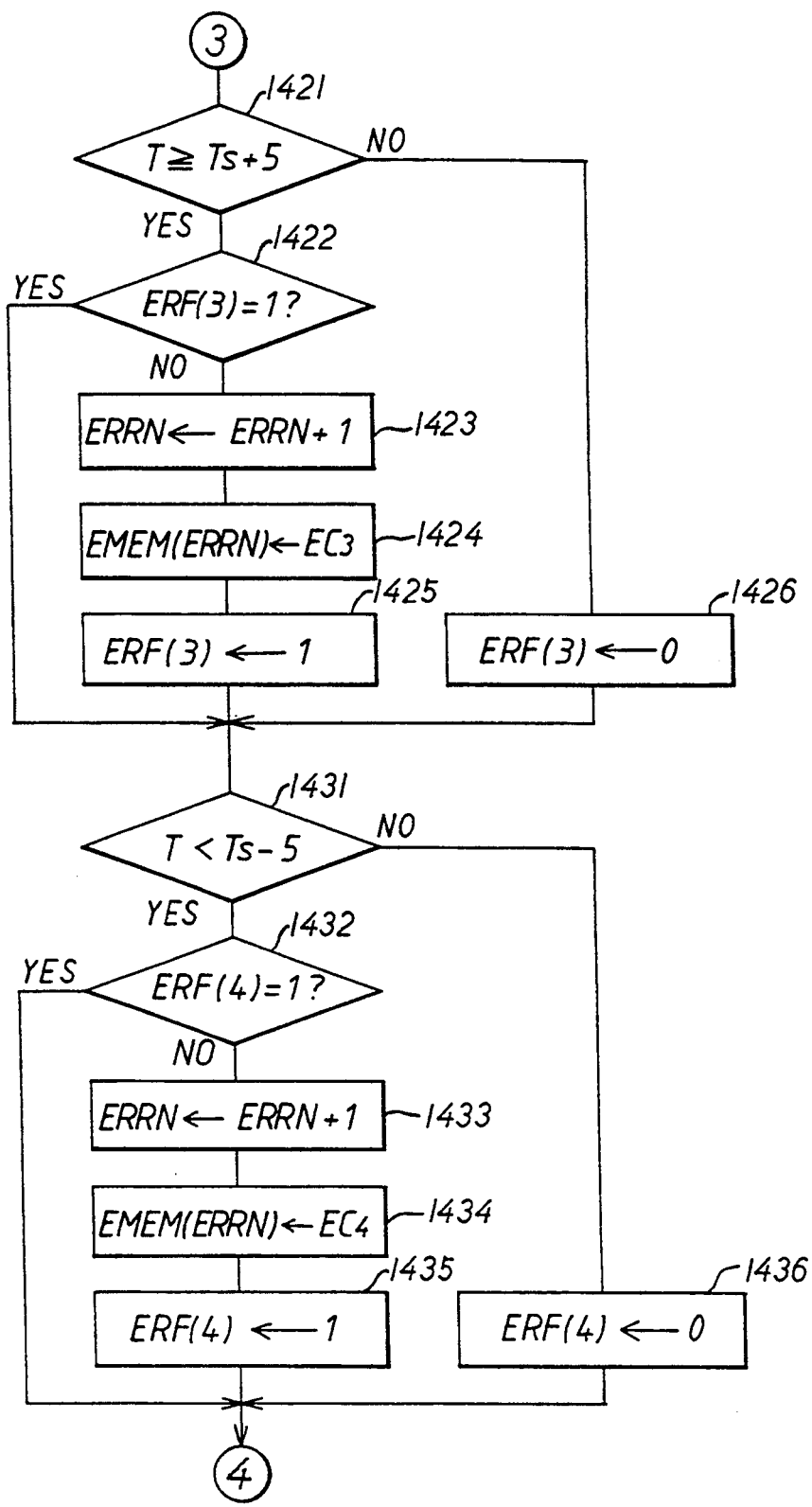

When explaining the case that various abnormalities of the low temperature storage house described above, "NO" answers are determined at steps 1401, 1411, 1421, 1431, 1441, 1451 of FIGS. 13-15 and the corresponding abnormal flags ERF(1)-ERF(6) are altered into zero. When the abnormal flags ERF(1)-ERF(6) are altered into zero as previously described, an "YES" is determined at step 1604 of the first indicate routine of FIG. 17. Therefore, the error codes EC1-EC6 which are indicated by the display 27 before are not indicated and only the error codes EC1-EC6 regarding the actually occurring abnormalities are repetitively indicated in sequence together with the internal temperature(-detected temperature T).

Next, explained are manipulation and operation for observing the error codes EC1-EC6 stored in the abnormal data memory EMEM.

Figure 18:
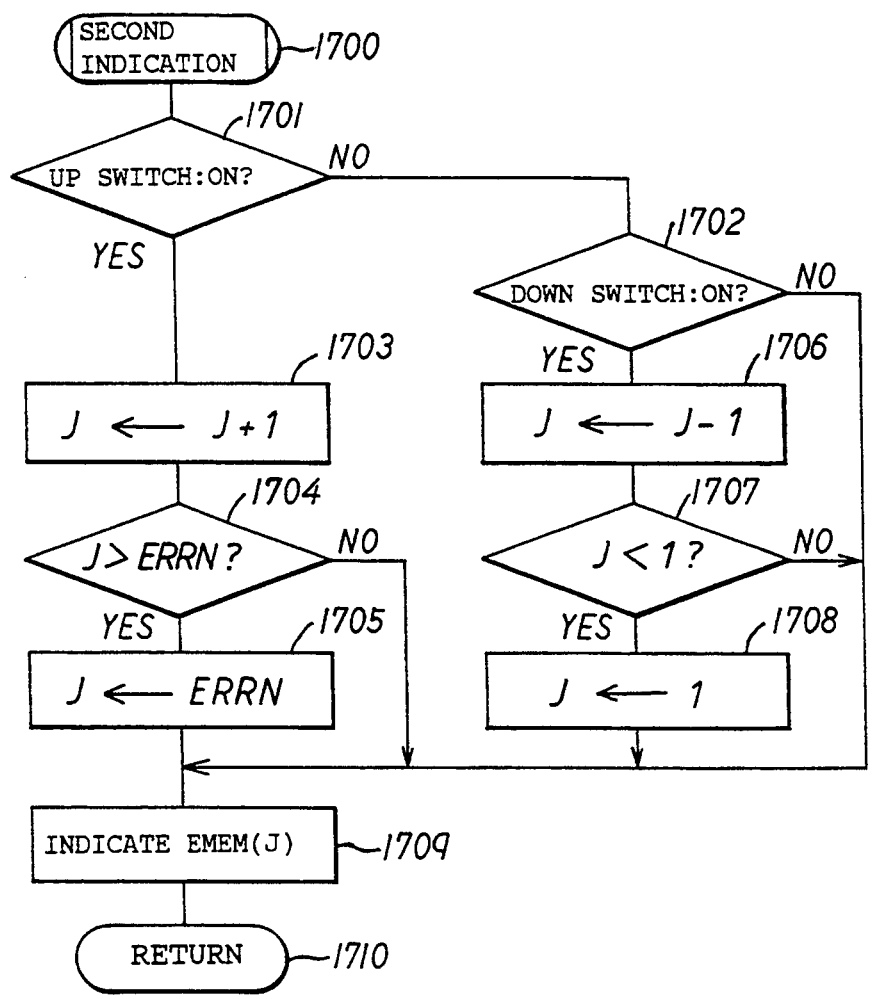

When the user turns on the display switchover switch 31, an "YES" answer is determined at step 1304 of the timer interrupt program of FIG. 12 and the second indication routine is performed at step 1308. The execution of the second indication routine is, as shown in FIG. 18, initiated at step 1700 and whether the up switch 33 or the down switch 34 is turned on or not is decided at steps 1701,1702. If both the switches 33, 34 are not turned on, "NO" answers are decided at steps 1701, 1702. Then, indication data representative of the error codes EC1-EC6 which are stored in the address location EMEM(J) addressed by a variable J in the abnormal data memory EMEM are applied to the display control circuit 26. Thus, the display control circuit 26 controls the display 27 which represents the error codes EC1-EC6.

When the up switch 33 is turned on under turning on of the display switchover switch 31, an "YES" answer is determined at step 1701. Then, the variable J is incremented by "1" at step 1703 and the error codes EC1-EC6 stored in the address location EMEM(J) addressed by the incremented variable J are indicated by the display 27 at step 1709. With this repetitive manipulations, the variable J is incremented one by one and the error codes EC1-EC6 stored in the address location EMEM(J) address by the incremented variable J are indicated by the display 27 in sequence. When the variable becomes larger than the abnormal occurrence number ERRN in dependence on increase of variable J, an "YES" answer is decided at step 1074 and the variable J returns to the abnormal occurrence number ERRN at step 1705. Thus, the variable J does not become larger than the abnormal occurrence number ERRN, even if the up switch 33 is further turned on.

When the down switch 34 is turned on under turning on of display switchover switch 31, an "YES" answer is determined at step 1702. Then, the variable J is decremented by "1" at step 1706 and the error codes EC1--EC6 stored in the address location EMEM(J) addressed by the variable J is indicated by the display 27 at step 1709 with the repetitive manipulations, the variable J is decremented one by one and the error codes EC1-EC6 stored in the address location EMEM(J) addressed by the decremented variable J are indicated by the display 27 in sequence. When the variable J becomes smaller than "1" in dependence on decrease of the variable J, a "YES" answer is determined at step 1707 and the variable J returns to "1" at step 1707. Thus, the variable J does not become smaller than "1", even if the down switch 34 is further turned on.

As previously described, the error codes EC1-EC6 which have been already stored in the respective addresses in EMEM(1)-EMEM(ERRN) of the abnormal data memory EMEM are read out sequentially by turning on of the display switchover switch 31, up switch 33 and down switch 34 and are indicated by the display 27. And, the error codes EC1-EC6 indicative of the kinds of abnormalities are written into those addresses EMEM(1)-EMEM(ERRN) in order of occurrence of the abnormalities by processing of abnormal detection routine shown in FIGS. 13-15. In this case, the error codes EC1-EC6 are written into the addresses EMEM(1)-EMEM(ERRN) are remained without deletion, even if the abnormalities disappear automatically. Thus, all the kinds of abnormalities which occurred from start of operation until now are indicated in sequence with sequential indication described above. As a result, it is possible to recognize a plurality of abnormalities occurred continuously due to one or plural causes within the low temperature storage house in order of occurrence in the abnormalities. This results in simplification in investigation of essential abnormal occurrence causes.

Furthermore, with the low temperature storage house, it is possible to clear all the error codes EC1--EC6 memorized in the abnormal data memory EMEM. In this case the user turns on the clear switch 35. With this turning on of the clear switch 35, an "YES" answer is determined at step 1309 of timer interrupt program of FIG. 12 and all the error codes EC1-EC6 stored in the abnormal data memory EMEM are cleared at step 1310. The abnormal occurrence number is simultaneously set into zero at step 311.

As a result it is easily capable to clear all the error codes EC1-EC6 which have been stored in the abnormal data memory EMEM. This means provision for the next detection of abnormality.

What is claimed is:

1. A display apparatus for displaying plural abnormalities in a low temperature storage cabinet having a temperature sensor for detecting an internal temperature of said storage cabinet, a cooling apparatus for cooling the interior of said storage cabinet, control means for controlling operation of said cooling apparatus to maintain the internal temperature in a predetermined range between upper and lower temperature limits, and display means for displaying the internal temperature of said storage cabinet in the form of letters, said display apparatus comprising:

detection means for detecting plural abnormalities in said storage cabinet;

means for forming abnormal data indicative of the respective natures of the detected abnormalities; and display control means for applying the abnormal data to said display means at each lapse of a predetermined time such that said display means is operated to alternately display the internal temperature of said storage cabinet and the respective natures of the detected abnormalities in the form of letters.

2. A display apparatus as claimed in claim 1, further comprising memory means for storing the abnormal data in the order of occurrence of the abnormalities, wherein said display control means is arranged to apply the stored abnormal data to said display means such that said display means is operated to display the respective natures of the abnormalities in the order of their occurrence.

3. A display apparatus as claimed in claim 2, further comprising abnormal data deletion means for deleting abnormal data indicative of the abnormal situations when the abnormal situations are no longer detected by said detection means.

4. A display apparatus for displaying plural abnormalities in a low temperature storage cabinet having a temperature sensor for detecting an internal temperature of said storage cabinet, a cooling apparatus for cooling the interior of said storage cabinet, control means for controlling operation of said cooling apparatus to maintain the internal temperature in a predetermined range between upper and lower temperature limits, and display means for displaying the internal temperature of said storage cabinet in the form of letters, said display apparatus comprising:

detection means for detecting plural abnormalities in said storage cabinet;

writable memory means;

writing means for writing abnormal data indicative of the detected abnormalities into said writable memory means in the order of their occurrence;

switchover means for switching over said display means from a first situation for display of the internal temperature of said storage cabinet to a second situation for display of the detected abnormalities;

advance means for advancing an address for reading out the abnormal data from said memory means;

means for reading out the abnormal data from said memory means in the order of occurrence of the abnormalities in accordance with advance of the address when said display means has been switched over to the second situation and for applying the abnormal data to said display means such that said display means is operated to display the respective natures of the detected abnormalities.

5. A display apparatus as claimed in claim 4, further comprising means for clearing the abnormal data stored in said memory means.

* * * * *